(12) United States Patent
Ikeda

(10) Patent No.: US 6,327,316 B1
(45) Date of Patent: *Dec. 4, 2001

(54) DATA RECEIVER USING APPROXIMATED BIT METRICS

(75) Inventor: Tamotsu Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/924,415

(22) Filed: Aug. 27, 1997

(30) Foreign Application Priority Data

Sep. 2, 1996 (JP) .................................................. 8-231746

(51) Int. Cl.⁷ .................................................. H03D 1/00
(52) U.S. Cl. ........................................... 375/341; 375/266
(58) Field of Search .................................... 375/341, 266; 371/43.4

(56) References Cited

U.S. PATENT DOCUMENTS

| 5,134,635 | 7/1992 | Hong et al. | 375/94 |
| 5,204,874 | 4/1993 | Falconer et al. | 375/1 |
| 5,438,590 | 8/1995 | Tzukerman et al. | 375/259 |

FOREIGN PATENT DOCUMENTS 0 537 706 A2   4/1993   (EP) .

OTHER PUBLICATIONS

IS95A, see co–pending application 08/924,318, May 1995.*
Yasuda et al., XP 000644974, IEEE Transactions on Communications, vol. COM–32, No. 3, pp. 315–319 (Mar. 1, 1984).
Caire et al., XP 000620676, Electronics Letters, vol. 32, No. 12, pp. 1060–1061 (Jun. 6, 1996).
International Telecommunication Union, Radiocommunication Study Groups Document 11–3/43–E, Aug. 29, 1996.

* cited by examiner

*Primary Examiner*—William Luther
(74) *Attorney, Agent, or Firm*—Lerner, David, Littenberg, Krumholz & Mentlik, LLP

(57) ABSTRACT

A data receiver for receiving data including multi-component signals representing symbols selected from a set of multi-component, multi-value symbols such as 16-QAM, 64-QAM or 256-QAM symbols. Each component of the signals denotes values for a plurality of bits, each bit being associated with one component of the signal. The receiver is arranged to set a value of a bit metric for each bit denoted by each signal based upon the value of the signal component associated with that bit. The bit metrics are selected so that when the signal component is in a first range, the bit metric is at a maximum; when the signal component is in a second range, the bit metric is at a minimum, whereas the signal component is in a third range, the bit metric has an intermediate value between the minimum and maximum values. The bit metric represents the probability that the receive signal represents a symbol denoting a particular value of the bit. The bit metrics can be subjected to bit-level processes such as bit insertion and bit diffusion reversal and the sequences of bit metrics can be subjected to maximum likelihood decoding schemes such as Viterbi decoding to deconvolute a convolutional code.

30 Claims, 18 Drawing Sheets

DATA RECEIVER USING APPROXIMATED BIT METRICS

FIELD OF THE INVENTION

The present invention relates to an apparatus and a method for receiving data and, more particularly, to a data receiver and a data receiving method for receiving multi-component signals representing values for several data bits.

BACKGROUND OF THE INVENTION

In the U.S.A., digital broadcasting bas already been started. Also in Europe, the organization for standardization "Digital Video Broadcasting (DVB)" has been formed to introduce digital TV broadcasting and its standard system is now being made. Such digital broadcasting is described, for example, in "Europe set to start digital satellite broadcasting in 1996 after successful U.S. nationwide services", NIKKEI ELECTRONICS 1.15, 1996 (No. 653), pp. 139–151.

In digital broadcasting and in other types of data transmission, it is desirable to minimize the power in the signal. This in turn reduces the ratio of signal power to noise power, and increases the probability of transmission errors. An error-correcting code is used to obtain a coding gain which compensates for this effect. Ordinarily, in a system using such a method, error-correcting coding is performed on the transmitting side while error-correcting decoding is performed on the receiving side.

A convolutional code is particularly advantageous for transmission on a communication path with a low signal power to noise power ratio (S/N ratio). As further explained below, a convolutional code effectively spreads the information contained in each bit of the original message into several bits of the transmitted signal. The receiver determines the value of each original bit from the received signals representing the bits of the transmitted signal. Because the transmitted signal contains redundant information, the original bit values can still be determined with good accuracy even if some of the bit values in the transmitted signal are corrupted by noise in the transmission path. The receiver can use a probabilistic or "soft" decoding scheme. If a most likely path decoding method such as Viterbi decoding is used, soft decision decoding can be performed easily and a high coding gain can be obtained.

In a "punctured" convolutional code, a sequence of bits output from a convolutional encoder is thinned out by deleting some of the bits in accordance with a certain rule. Thus, the redundancy introduced by convolutional encoding is reduced, and a plurality of code rates can be achieved easily.

It is also possible to improve tolerance to noise in a transmission path by diffusing bits of an encoded signal, such as the bits of a code sequence output from a punctured convolutional code encoder, in accordance with a certain rule. "Diffusing" in this context refers to shuffling or reordering the bits.

FIG. 9 shows an example of a transmitter proposed in accordance with the standard DVB-T for DVB ground wave television. This transmitter uses a punctured convolutional code, bit diffusion and a quadrature phase-shift keying (QPSK) system.

In the example shown in FIG. 9, serial data output from an information source 1 is input to a convolutional encoder 2, and mother code sequences X and Y are generated by the encoder 2. Each of X and Y represents a 1-bit code sequence. Thus, each bit of original data from information source 1 results in generation of two bits of mother code data; one bit in sequence X, and one bit in sequence Y. Stated another way, in this example, the code rate of convolutional encoder 2 is set to ½.

FIG. 10 shows an example of the convolutional encoder 2. The particular encoder 2 is not arranged in accordance with the DVB-T standard; it is a simple encoder intended for explanation of the principle of convolutional processing. In this example, 1-bit serial data output from an information source 1 is input through a terminal 21, delayed one clock cycle by each of delay circuits 22 and 23 and thereafter output to adder circuits 24 and 25. The output from terminal 21 and the output from delay circuit 22 are also supplied to the adder circuit 24. Adder circuit 24 adds these groups of data together (by exclusive OR operation) and outputs the result of this addition as data X through a terminal 26. Adder circuit 25 adds the output from the terminal 21 and the output from the delay circuit 23 together (by exclusive OR operation) and outputs the result of this addition as data Y through a terminal 27.

In this example, the two mother code bits X and Y which are obtained when one original bit is input at terminal 21 will depend on the internal state of the delay circuits 22 and 23 prior to arrival of that original bit. The state of the delay circuits 22 and 23 in turn will depend upon the values of the bits which were previously supplied through terminal 21. Stated another way, the information in each bit of the original message is spread among several bits of the mother code sequences. In this example, the constraint length is 3, the number of internal delay elements is 2, the number of states is 4, and the code rate is ½.

FIG. 11 is a state diagram showing state transitions of the convolutional encoder shown in FIG. 10. If an original code bit with value 0 is input through terminal 21 when the state is 00 (when each of the outputs of the delay elements 22 and 23 is 0), (XY)=(00) is output through the terminals 26 and 27. That is, mother code bit 0 is output as data X through terminal 26, whereas mother code bit 0 is output as data Y through terminal 27. The state is also 00 after the transition resulting from the 0 input; the outputs of each of delay elements 22 and 23 remain 0. In the case where 1 is input when the state is 00, (XY)=(11) is output and the state changes to 10. In the case where 0 is input when the state is 01, (XY)=(11) is output and the state changes to 00. In the case where 1 is input when the state is 01, (XY)=(00) is output and the state changes to 10.

The inputs and outputs associated with these and other states are shown in FIG. 11 as expressions such as "1/01", denoting input/outputs. In each such expression, the first digit represents the input, whereas the second digit represents the X output resulting from that input and the last digit represents the Y output resulting from the input.

The mother code sequences X and Y provided by convolutional encoder 2 are input to a bit erase circuit 3, which performs bit erasing in accordance with a predetermined rule, and forms the remaining bits into a serial bit stream constituting a punctured convolutional code message. The bit erase circuit 3 erases data at predetermined positions in the mother code sequences (XY), in accordance with an erase map:

X: 10
Y: 11

Bits corresponding to 1 in the erase map are transmitted but bits corresponding to 0 in the map are not transmitted (erased). Stated another way, every other bit in the X mother code sequence is omitted from the serial bit stream formed by the bit erase circuit. Thus, if the outputs of convolutional encoder 2 in response to two successive inputs are X1, Y1 in response to the first input and X2, Y2 in response to the next input, the bit erase circuit will transmit a serial stream X1Y1Y2. The same series of operations is repeated during every two successive clock cycles of the apparatus.

The bit erase circuit reduces redundancy in the coded message and thus changes the code rate. Considering the convolutional encoder and the bit erase circuit together, the number of bits in the original message input to the convolutional encoder 2 is 2 and the number of bits in the punctured convolutional code output from the bit erase circuit 3 is 3, so that the code rate is ⅔.

The bit stream or serialized punctured convolutional code sequence output from the bit erase circuit 3 is input to a serial-parallel converter 4. Serial-parallel converter 4 converts one input data sequence X1, Y1, Y2, . . . into two data sequences (x, y).

The data sequences x and y from converter 4 undergo bit diffusion in bit diffusion circuits 5-1 and 5-2. The order of bits is in each sequence is diffusively changed (made complex). Each of the bit diffusion circuits 5-1 and 5-2 performs bit diffusion by changing the order of the bits in data sequence x or y in accordance with a predetermined rule. Ordinarily, the rules applied by the bit diffusion circuits 5-1 and 5-2 are different from each other.

In an example of such bit diffusion, M bits of input data is assumed to be one block, and a suitable value s is set. The bit diffusion process is performed by replacing a vector formed of an M-bit input sequence:

(B0, B1, . . . , Bk, . . . , BM−1) with a vector formed of an M-bit output sequence after diffusion:
(B'0, B'1, . . . , B'n, . . . , B'M−1), where B'n=Bk (n=k+s mod M).

The bit diffusion circuits 5-1 and 5-2 may use the same algorithm with different values of s.

Data sequences x' and y' after bit diffusion, constituting a diffused punctured convolutional code message, are output from the bit diffusion circuits 5-1 and 5-2, and input to a signal point assignment circuit 6.

Signal point assignment circuit 6 outputs coordinate data I' and Q' of signal points representing an in-phase component (I component) and a quadrature component (Q component) orthogonal to each other. For example, the assignment of data (x', y') as signals in the transmission channel is performed on the basis of the quadrature phase shift keying (QPSK) symbol set as shown in FIG. 12. That is, the data is assigned so that when (x', y')=(0, 0), (I', Q')=(1/√2, 1/√2) is set;

when (x', y')=(0, 1), (I', Q')=(1/√2, −1/√2) is set;

when (x', y')=(1, 0), (I', Q')=(−1/√2, 1/√2) is set; and when (x', y')=(1, 1), (I', Q')=(−1/√2, −1/√2) is set. Each set of components (I',Q') constitutes one QPSK symbol. Each such symbol includes a first component I' denoting the value of one bit x' in the diffused punctured convolutional code message and a second component Q' denoting the value of another bit y' in the diffused punctured convolutional code message.

A symbol diffusion circuit 7 reorders the QPSK symbols prescribed by data I' and Q' output from the signal point assignment circuit 6 to obtain symbols S (I, Q). This diffusion processing increases resistance of the system to burst errors in the transmission path. The diffusion circuit changes the order of symbols S' represented by (I', Q') in accordance with a predetermined rule to obtain the diffused symbols S represented by (I,Q).

For example, if N−1 symbols form a diffusion unit block and if a number G smaller than N is selected such that G and N are prime to each other, diffusion is executed as replacement of a vector formed of symbols before diffusion:

(S'1, S'2, . . . , S'k, . . . , S'N−1) with a vector formed of symbols after diffusion:
(S1, S2, . . . , Sn, . . . , SN−1), where Sn=S'k (n=G^k mod N). In this expression, G^k means G to the kth power. Diffusion circuit 7 outputs the I and Q components of the symbols after symbol diffusion. A modulator 8 modulates a carrier wave with the I and Q components of symbols S on the basis of the orthogonal frequency division multiplex (OFDM) method and transmits the modulated wave through an antenna 9.

FIG. 13 shows the configuration of a receiver for receiving data from the transmitter shown in FIG. 9. A demodulator 32 demodulates an electric wave received through an antenna 31 and outputs a series of signals, corresponding to the series of symbols supplied to the modulator 8 of the transmitter. Each such signal includes an I component and a Q component corresponding to the I and Q components of the transmitted symbols. It should be appreciated that the I and Q components of the signals output by demodulator are not perfect duplicates of the I and Q values supplied to modulator of the transmitter. Noise and other imperfections in the transmission path cause variations in the received I and Q values. The I and Q values constituting the received signals are handled in the receiver as real values, i.e., either as analog values or, preferably, as multi-bit digital values. Demodulator 32 supplies the received signals as series of I and Q components.

A symbol diffusion reversal circuit 33 processes the received signals in a manner inverse to the symbol diffusion processing in the symbol diffusion circuit 7 of the transmitter (FIG. 9). Thus, the diffusion reversal circuit restores the received signals to the original order of the symbols before the order was changed in the symbol diffusion circuit 7. This diffusion reversal operation, if expressed by using the same N and G as those used with respect to the symbol diffusion circuit 7, is replacement of a vector formed of signals before diffusion reversal processing:

(S1, S2, . . . , Sn, . . . , SN−1) with a vector formed of signals after diffusion reversal processing:
(S'1, S'2, . . . , S'k, . . . , S'N−1), where Sn=S'k (n=G^k mod N).

I component values I' and Q component values Q' output from the symbol diffusion reversal circuit 33 are supplied to bit diffusion reversal circuits 34-1 and 34-2, respectively. The bit diffusion reversal circuits process the I' and Q' components output in a manner inverse to the bit diffusion applied by the bit diffusion circuits 5-1 and 5-2 of the transmitter. Thus, bit diffusion reversal circuit 34-1 processes items of data (I component values) in blocks of M items. A vector formed of a sequence of output M items after diffusion reversal processing:

(B0, B1, . . . , Bk, . . . , BM−1) is obtained from a vector formed of a sequence of input M items:
(B'0, B'1, . . . , B'n, . . . , B'M−1), where B'n=Bk (n=k+s mod M).

The value s used in bit diffusion reversal processing in the bit diffusion reversal circuit 34-1 is the same as the value s used in the bit diffusion circuit 5-1 of the transmitter. Bit diffusion reversal circuit 34-2 operates in the same manner, but uses a value s equal to the value s used by the other bit diffusion reversal circuit 5-2.

The two data sequences (x, y) output from the bit diffusion reversal circuits 34-1 and 34-2 are input to a parallel-serial converter 35 to be converted into one data sequence to be supplied to a bit insertion circuit 36. The parallel-serial converter 35 performs the operation reverse to that of the serial-parallel converter 4 to convert the two data sequences (x, y) into one data sequence.

The bit insertion circuit 36 splits the serial data stream into two parallel data streams and performs bit insertion processing inverse to the bit erase processing in the bit erase circuit 3 shown in FIG. 9. The bit insertion circuit 36 uses the same map used by the bit erase circuit of the transmitter:

X: 10
Y: 11

Thus, when data is input in the order of x1, y1, y2 to insertion circuit 36, an arbitrary dummy data item (here assumed to be 0) is inserted at the position corresponding to the erased data item and X1 (=x1), 0 are output as X data, and Y1 (=y1), Y2 (=y2) are output as Y data in this order.

The output data sequences X and Y are supplied to a Viterbi decoder 37. Also, an insertion flag indicating the position at which the dummy data is inserted is supplied to the Viterbi decoder 37. At this stage of processing, the individual data elements of sequences X and Y (other than the dummy values) are still real numbers corresponding to the values of the I and Q components in the received signals, rather than single-bit 1 or 0 elements. The real numbers in these data sequences correspond to the 1 and 0 values of the mother codes output by the convolutional encoder 2 of the transmitter. If the transmission channel were a perfect channel, each number corresponding to a 0 in the mother code would have exactly the same value, equal to the nominal value $1/\sqrt{2}$ assigned by the signal point assignment circuit of the transmitter, whereas each number corresponding to a 1 in the mother code would have the other nominal value $-1/\sqrt{2}$. However, noise and other imperfections in the transmission path between the transmitter and receiver will cause these values to vary somewhat from the nominal values.

The Viterbi decoder 37 decodes the data sequences X and Y to recover the reproduced information corresponding to the original message. Thus, the decoder performs Viterbi decoding according to the state transitions (FIG. 11) of the convolutional encoder 2.

FIG. 14 shows an example of the Viterbi decoder 37. Data X and Y output from the bit insertion circuit 36 are supplied to input terminals 62-1 and 62-2 respectively for input to branch metric calculation circuits 63-1 to 63-4. Each of the branch metric calculation circuits 63-1 to 63-4 calculates, as a branch metric, the distance between the input data (X, Y) and an associated one of the coordinate points defined by nominal values shown in FIG. 12.

Outputs (branch metrics) BM00 and BM11 from the branch metric calculation circuits 63-1 and 63-4 are input to add compare select (ACS) circuits 64-1 and 64-3. Also, an output (branch metric) BM01 from the branch metric calculation circuit 63-2 and an output (branch metric) BM10 from the branch metric calculation circuit 63-3 are input to ACS circuits 64-2 and 64-4.

Four state metric storage units 66-1 through 66-4 are provided. State metric storage unit 66-1 has an input 66-1a connected to an output of ACS unit 64-1. In like manner, each of the other state metric storage units 66-2, 66-3 and 66-4 has an input connected to the outputs of ACS units 64-2, 64-3 and 64-4, respectively.

An output (state metric) SM00 from state metric storage 66-1 and an output (state metric) SM01 from state metric storage 66-2 are also input to the ACS circuits 64-1 and 64-3.

An output (state metric) SM10 from state metric storage 66-3 and an output (state metric) SM11 from state metric storage 66-4 are also input to the ACS circuits 64-2 and 64-4.

Each of the ACS circuits 64-1 to 64-4 calculates the sum of one of the input branch metrics BM and the corresponding state metric SM and calculates the sum of the other input branch metric BM and the corresponding state metric SM. Each of the ACS circuits 64-1 to 64-4 compares the two sums with each other to select the smaller one of them, outputs the smaller sum as a new state metric SM to the corresponding one of the state metric storage units 66-1 to 66-4, and outputs signals SEL00 to SEL11 representing the selection result to a path memory 65. State metrics SM00 to SM11 from the state metric storages 66-1 to 66-4 are also input to the path memory 65.

Each of the state metric storages 66-1 to 66-4 can be reset by a signal which is input via a terminal 61. The path memory 65 outputs the result of decoding through a terminal 67.

The operation of the Viterbi decoder 37 will be described in more detail. Branch metric calculation circuit 63-1 calculates the distance between the input data (X, Y) and the coordinate point $(1/\sqrt{2}, 1/\sqrt{2})$ as branch metric BM00. Similarly, Branch metric calculation circuit 63-2 calculates the distance between the input data (X, Y) and the coordinate point $(1/\sqrt{2}, -1/\sqrt{2})$ as branch metric BM01. Branch metric calculation circuit 63-3 calculates the distance between the input data (X, Y) and the coordinate point $(-1/\sqrt{2}, 1/\sqrt{2})$ as branch metric BM10. Branch metric calculation circuit 63-4 calculates the distance between the input data (X, Y) and the coordinate point $(-1/\sqrt{2}, -1/\sqrt{2})$ as branch metric BM11. In computing the branch metrics, distance calculation with respect to the inserted dummy data is omitted in response to the insertion flag supplied from the bit insertion circuit 36. That is, the distance between each inserted dummy data value and the related coordinate point is set to a zero value as further discussed below with reference to FIG. 15.

ACS circuit 64-1 performs two calculations shown below corresponding to the state transitions of the convolutional encoder 2, and selects one of the results of these calculations with a higher likelihood, i.e., the smaller one of the calculation results. Information SEL00 on this selection is supplied to the path memory 65 while the calculation result is SM00 is supplied to the state metric storage 66-1.

$$SM00+BM00 \tag{1}$$

$$SM01+BM11 \tag{2}$$

SM00 is the value of the state metric storage 66-1 remaining from the preceding clock cycle, i.e., the value of the state metric resulting from processing the preceding X and Y values in the data sequence. Similarly, SM01 is the value remaining in state metric storage 66-2 from the preceding clock cycle. BM00 is the result of calculation of the branch metric calculation circuit 63-1, and BM11 is the result of calculation of the branch metric calculation circuit 63-4.

If the result of calculation (1) is smaller, SEL00=0 is supplied to the path memory 65. If the result of calculation (2) is smaller, SEL00=1 is supplied to the path memory 65. In the former case, SM00+BM00 is stored as new state metric SM00 in the state metric storage 66-1. In the latter case, SM01+BM11 is stored as new state metric SM00 in the state metric storage 66-1.

This calculation will be described with reference to the state transition diagram of FIG. 11. The branch metrics can be understood as representing the likelihood that the input data (X, Y) represents the mother code bits produced by a transition of the convolutional encoder which resulted in particular outputs. For example, if input data X, Y having values very close to the nominal values ($1/\sqrt{2}$, $1/\sqrt{2}$) is received, and hence the magnitude of BM00 is small, then it is likely that the input data was produced by a transition of the convolutional encoder 2 at the transmitter which produced outputs (mother code bits X, Y) of 00. The state metrics can be understood as representing the probability that the convolutional encoder 2 at the transmitter which produced the data was in a particular state, with smaller values of the state metrics representing greater probability. For example, a smaller value of SM00 indicates a high probability that the encoder was in state 00. There are two paths to the state 00. The first path is defined by input of 0 in the state 00 and by output of 00. A corresponding comparative calculation is represented by expression (1). The second path is defined by input of 0 in the state 01 and by output of 11. A corresponding comparative calculation is represented by expression (2). The smaller one of the two calculation results is supplied as new state metric SM00 to the state metric storage 66-1.

Each of the ACS circuits 64-2 to 64-4 also performs the same operation. Each of the state metric storages 66-1 to 66-4 is reset to 0 in an initial stage of the operation of the system. Control of this resetting is performed by a controller (not shown) via the terminal 61.

Path memory 65 generates the reproduced data which is the final output of the receiver, in accordance with the state transitions shown in FIG. 11. The path memory uses selection information SEL00 to SEL11 supplied from the ACS circuits 64-1 to 64-4 and the state metrics SM00 to SM11 supplied by state metric storage units 66-1 to 66-4.

FIG. 15 shows a branch metric calculation circuit 63-1 in detail. Data X input through the terminal 62-1 is input to a subtracter circuit 51, which subtracts $1/\sqrt{2}$ supplied from a generator circuit 52 from data X. The difference output from the subtracter circuit 51 is supplied to two input terminals of a multiplier circuit 53 and multiplied by itself (i.e., squared). A selector 203 is supplied with an output from the multiplier circuit 53 and with a 0 output from a generator circuit 202. When the flag indicating insertion in X is input to the selector 203 from bit insertion circuit 36 (FIG. 13) via a terminal 201, the selector 203 selects the 0 generated by the generator circuit 202. When no flag indicating insertion in X is input, the selector 203 selects the output from the multiplier circuit 53. The selector 203 outputs the selected value to an adder circuit 54.

Data Y input via the terminal 62-2 is input to a subtracter circuit 55, which subtracts $1/\sqrt{2}$ supplied from a generator circuit 56 from data Y. The output from subtracter circuit 56 is supplied to two input terminals of a multiplier circuit 57 to be multiplied by itself (i.e., squared). A selector 206 is supplied with an output from the multiplier circuit 57 and with an output from a 0 generator circuit 205. When the flag indicating insertion in Y is input to the selector 206 via a terminal 204, the selector 206 selects 0 from circuit 205. When no flag indicating insertion in Y is input, the selector 206 selects the output from the multiplier circuit 57. The selector outputs the selected value to adder circuit 54. The adder circuit 54 calculates the sum of the outputs from the selectors 203 and 206 and outputs the sum as branch metric BM00.

Thus, when no insertion flag is supplied, the operation of this branch metric calculation circuit is as described below. The subtracter circuit 51 outputs $X-1/\sqrt{2}$, and the multiplier circuit 53 squares this value to output $(X-1/\sqrt{2})^2$. Also, the subtracter circuit 55 outputs $Y-1/\sqrt{2}$, and the multiplier circuit 57 squares this value to output $(Y-1/\sqrt{2})^2$. The adder circuit 54 calculates the sum of the outputs from the multiplier circuits 53 and 57, i.e., $(X-1/\sqrt{2})^2+(Y-1/\sqrt{2})^2$ and outputs this value as branch metric BM00.

On the other hand, when the flag indicating insertion in X is input, the selector 203 outputs 0, so that the output from the adder circuit 54 is $(Y-1/\sqrt{2})^2$. When the flag indicating insertion in Y is input, the selector 206 outputs 0 and the output from the adder circuit 54 is $(X-1/\sqrt{2})^2$.

Each of the branch metric calculation circuits 63-2 to 63-4 have the same circuit configuration as that shown in FIG. 15 and performs the same operation. In the branch metric calculation circuit 63-2, however, the output of the generator circuit 52 is $1/\sqrt{2}$ and the output of the generator circuit 56 is $-1/\sqrt{2}$. In the branch metric calculation circuit 63-3, the outputs of the generator circuits 52 and 56 are $-1/\sqrt{2}$ and $1/\sqrt{2}$, respectively. In the branch metric calculation circuit 63-4, the output of each of the generator circuits 52 and 56 is $-1/\sqrt{2}$.

FIG. 16 is a block diagram of the path memory 65. Selection information items SEL00 to SEL11 output from the ACS circuits 64-1 to 64-4 are supplied to terminals 71-1 to 71-4. The selection information items SEL00 to SEL11 are input as control signals to two-input one-output selectors 73-1 to 73-4, respectively. A fixed data item 0 is supplied from a terminal 72-1 as two inputs to the selector 73-1, whereas fixed data item 0 is supplied from terminal 72-2 as the two inputs of selector 73-2. Similarly, a fixed data item 1 is supplied from terminals 72-3 and 72-4 as two inputs to each selector 73-2 to 73-4.

Each of the selectors 73-1 to 73-4 selects one of the two inputs according to the corresponding one of the selection information items SEL00 to SEL11 and outputs the selected data item to the corresponding one of registers 81-1 to 81-4. As mentioned above the same data item from one of the terminals 72-1 to 72-4 is input as two inputs to the corresponding one of the first-column selectors 731 to 73-4. Therefore, the first-column registers 81-1 to 81-4 store 0, 0, 1, and 1, respectively.

Other selectors and registers are arranged in the same manner as those described above; the selectors and registers are arranged in n columns (four columns in the example shown in FIG. 16). That is, in the second column, selectors 74-1 to 74-4 and registers 82-1 to 82-4 are provided. Outputs from first-column registers 81-1 and 81-2 are supplied to the selectors 74-1 and 74-3 in the second column. Outputs from first-column registers 81-3 and 81-4 are supplied to second-column selectors 74-2 and 74-4. Each of the second-column selectors 74-1 to 74-4 performs processing such as to select one of the two inputs according to the value of the corresponding one of the selection information items SEL00 to SEL11 and to output the selected data item to the corresponding one of the second-column registers 82-1 to 82-4. For example, register 74-1 selects the output of register 81-1 when selection information item SEL00 is 0, selects the output of register 81-2 when selection information item SEL00 is 1, and outputs the selected data item to register 82-1. The third and fourth column selectors and registers operate in a similar manner.

Outputs from registers 84-1 to 84-4 in the final column are input to a four-input one-output selector 85. State metrics SM00 to SM11 output from the state metric storages 66-1 to 66-4 shown in FIG. 14 are input to a minimum value comparator circuit 88. The minimum value comparator circuit 88 compares the four state metrics and selects the smallest of them. The minimum value comparator circuit 88 outputs data 00 if the state metric SM00 is the smallest, data 01 if the state metric SM01 is the smallest, data 10 if the state metric SM10 is the smallest, and data 11 if the state metric SM11 is the smallest. The selector 85 selects the output of the register 84-1 when the input from the minimum value comparator circuit 88 is 00, the output of the register 84-2 when the input from the minimum value comparator circuit 88 is 01, the output of the register 84-3 when the input from the minimum value comparator circuit 88 is 10, and the output of the register 84-4 when the input from the minimum value comparator circuit 88 is 11. The output from the selected register is output by selector 85 as a decoding result through a terminal 86. The sequence of outputs from terminal 86 represents the reproduced information.

The above-described connections in the path memory 65 provide outputs corresponding to the state diagram of FIG. 11. The fixed values (0 and 1) at terminals 72-1 to 72-4 represent possible decoded information items. The values which will propagate through the matrix of selectors and registers will depend on the values of selection information SEL00 through SEL11. Those values in turn depend on the values of the state metrics and branch metrics during each clock cycle as discussed above. In effect, the data items which appear at the final registers 84-1 through 84-4 are associated with different possible paths through the trellis or sequence of states of the convolutional encoder. The data item corresponding to the path with the maximum likelihood is selected from the four data items stored in registers 84-1 through 84-4 of the final column, and the selected item is output as the reproduced information. The selector 85 selects the item corresponding to the state metric minimum value, i.e., the path with the maximum likelihood, at each time point. Stated another way, the Viterbi decoder yields a sequence of reproduced data which represents the most likely sequence of original data input to the convolutional encoder at the transmitter. In choosing the most likely sequence, the decoder selects each bit of the reproduced data on the basis of several bits of transmitted data. This provides substantial coding gain.

The increasing demand for high speed data transmission makes it desirable to extend the digital data transmission system described above from the QPSK implementation to other, more complex modulation systems. In the more complex transmission schemes, each transmitted signal denotes values for more than two bits. Each signal typically includes two components, each component having more than two possible nominal values. Examples of such modulation systems include 16-QAM, 64-QAM, and 256-QAM. In the 16-QAM system, each symbol includes two components, and each component has four possible nominal values, so that any one of 16 possible symbols can be transmitted. Thus, each symbol can denote values for four bits. The 64-QAM and 256-QAM systems use symbol sets with 64 and 256 possible symbols to encode six and eight bits per symbol, respectively. By comparison, in the QPSK system described above, only two bits are encoded in each symbol. The more complex transmission systems offer the possibility of higher data transmission rates. However, it is difficult to use an encoding and decoding strategy with convolutional or punctured convolutional coding and with bit diffusion as described above in combination with a multi-component, multi-value modulation system.

FIG. 17 depicts a data transmitter using 16-QAM. In FIG. 17, sections corresponding to the QPSK transmitter of FIG. 9 are indicated by the same reference numerals. The convolutional encoder 2 and bit erase circuit 3 are identical to those used in the QPSK transmitter, and produce a punctured convolutional code sequences identical to that discussed above. However, the serial-parallel converter 4 of FIG. 17 splits the serial data output from bit erase circuit 3 into four parallel data streams u, v, x, and y. These data items in each undergo bit diffusion processing in bit diffusion circuits 91-1 to 91-4 to yield reordered data u', v', x', and y', which are supplied to a signal point assignment circuit 6. The bit diffusion processing applied to each data sequence is the same as that applied in the bit diffusion circuits 5-1 and 5-2 of FIG. 9. The bit diffusion processing is varied with respect to the data sequences by using different values s for each data sequence.

The signal point assignment circuit 6 assigns input 4-bit data (u', v', x', y') as symbols of the 16-QAM symbol set shown in FIG. 18. In the 16-QAM set, each symbol includes two components I' and Q'. Each component can have any one of four nominal values, and each component denotes values of two bits. Thus, component I' denotes the values of the first and third bits of the 4-bit data, whereas component Q' denotes the values of the second and fourth bits. For example, (I', Q')=(3/$\sqrt{10}$, 3/$\sqrt{10}$) when (u', v', x', y')=(0, 0, 0, 0), and
(I', Q')=(3/$\sqrt{10}$, 1/$\sqrt{10}$) when (u', v', x', y')=(0, 0, 0, 1).

The symbols produced by signal point assignment circuit 6 are subjected to symbol diffusion in a symbol diffusion circuit 7 in the same manner as discussed above, and the reordered components I and Q are supplied to a modulator 9 and transmitted by OFDM modulation as discussed above. In other respects, the configuration of the transmitter shown in FIG. 17 is the same as that shown in FIG. 9.

A receiver for the 16-QAM signal from the transmitter of FIG. 17, constructed in a manner analogous to the QPSK receiver of FIG. 13, would have the structure shown in FIG. 19. However, a receiver as shown in FIG. 19 will not operate properly.

In the QPSK system as described above with reference to FIG. 13, each of the signal components I and Q input from the symbol diffusion reversal circuit 33 to the bit diffusion reversal circuits 34-1 and 34-2 represents one bit of the bit-diffused punctured convolutional code message. Therefore, reordering of the I and Q signal components by the bit diffusion reversal circuits, in a manner inverse to the reordering applied by the bit diffusion circuits of the transmitter, will restore the signal components to the same order as the order of the bits in the message before bit diffusion processing. However each of components I and Q in the 16-QAM system represents two bits. In the symbol set or signal point constellation shown in FIG. 18, I includes information of the first and third bits while Q includes information of the second and fourth bits. However, I is one value such as 1/$\sqrt{10}$ or 3/$\sqrt{10}$, and Q is also such one value. If the stream of I and Q component values is simply divided into four data streams as shown in FIG. 19, each data item in each data stream u', v', x' and y' still represents two bits, rather than a single bit. Applying diffusion reversal processing in circuits 95-1 to 95-4, inverse to the bit diffusion processing applied to single-bit data items by transmitter bit diffusion circuits 91-1 to 91-4 (FIG. 17) will scramble the data; it will not recover the original order. Stated another way, the bit diffusion operation is performed at the transmitter on single-bit data, but the signal component values I and Q represent two bits each. Therefore, the inverse operation cannot be performed on the I and Q component values at the receiver.

The same problem arises in connection with the bit erase and bit insertion operations. Thus, the bit erase circuit 3 of the transmitter in FIG. 17 operates on single bits of the mother code. Operation of the bit insertion circuit 36 to insert dummy data into a stream of two-bit component value, will further scramble the data and will not restore the original structure of the data. The result of Viterbi decoding of the output from the bit insertion circuit 36 by the Viterbi decoder 37 would be completely different from the original data.

It would appear that the problems associated with handling component values representing multiple bits could be obviated by recovering the individual bit values at or immediately after the symbol diffusion reversal circuit 33 of the data receiver shown in FIG. 19. Thus, prior to the bit diffusion reversal circuit, the I and Q components of each signal can be evaluated to yield the individual bit values u', v', x' and y'. In such a case, the distances between the coordinates (I, Q) defined by the I and Q components of each received signal and the nominal signal points shown in FIG. 18 are calculated. The received signal is deemed to represent the symbol associated with the closest nominal signal point, and bit values are assigned on the basis of that symbol. For example, a received signal having I and Q coordinates close to coordinates $(-1/\sqrt{10}, 3/\sqrt{10})$ is deemed to represent the symbol having nominal values $(-1/\sqrt{10}, 3/\sqrt{10})$, i.e., 1010 in FIG. 18. The bit values associated with this symbol are assigned to the 4-bit data; u'=1, v'=0, x'=1 and y'=0. The bit values recovered in this manner are single-bit values and can be processed through bit diffusion reversal and bit insertion.

However, such a system makes a "hard" decision as to the value of each bit based on the content of a single received signal. It sacrifices the advantages of noise immunity and coding gain obtained by "soft" decoding, such as the Viterbi decoding discussed above, in which information transmitted in several signals, during several unit times, contributes to the decision made by the receiver as to the most probable value for each bit of the reproduced information.

Similar problems arise in other multi-value, multi-component modulation systems such 64-QAM or 256-QAM. Thus there has been a need for improved receiving apparatus and methods which can accurately receive and decode data transmitted by a multi-value, multi-component modulation system can be accurately decoded.

SUMMARY OF THE INVENTION

One aspect of the present invention provides a data receiver for receiving data which includes a series of multi-component signals representing symbols selected from a set of possible multi-component, multi-value symbols. In the received data, each component of each signal denotes values for a plurality of bits. Thus, two or more bits are associated with each component of the signal. The value of each bit is denoted by the associated component. The data receiver in accordance with this aspect of the invention includes means for determining the value of each component in each received signal and means for setting a value of a bit metric for each bit denoted by each signal based upon the value of the signal component associated with that bit. Most preferably, first, second and third ranges are defined for each bit. The value setting means is arranged to set the bit metric for each bit so that the bit metric has a predetermined maximum value when the signal component associated with the bit is in the first range defined for that bit; so that the bit metric has a predetermined minimum value when the component associated with the bit is in the second range defined for the bit and so that the bit metric has an intermediate value, between the maximum and minimum values, when the component associated with the bit is in the third range defined for the bit.

Preferably, the setting means is operative to set the bit metric for each bit denoted by each received signal, so that the bit metric for each bit is correlated with the probability that the received signal represents a transmitted symbol which denotes a first value of the bit. For example, the bit metric setting means may be arranged to set the bit metric so that the bit metric correlates to the probability that the received signal represents a transmitted signal denoting a zero value for the bit. The setting means may be arranged to set the bit metric for each bit by interpolation when the associated component of the received signal is in the third range defined for that bit. Such interpolation may be a linear interpolation, so that the value of the bit metric varies linearly with the value of the associated signal component in the third range. As further discussed below, such linear variation provides a reasonable approximation to the desired probability and can be determined rapidly by simple and inexpensive circuitry. Alternatively, the bit metric setting means may include a memory having stored therein a set of bit metrics, different bit metrics being stored at different addresses in the memory and may also include reading means for selecting an address in the memory for each bit of each received signal based upon the component of the received signal associated with that bit and reading out of the memory the bit metric stored at each selected address. Here again, the bit metrics can be found by simple and inexpensive circuitry, compatible with digital signal processing.

Because each bit metric represents a single bit of transmitted data, the bit metrics can be handled and subjected to processes such as bit diffusion reversal and bit insertion inverse to the bit diffusion and bit erasure processes applied to single-bit data at the transmitter. The receiver may include means for forming sequences of bit metrics and reordering the bit metrics so as to reverse a bit diffusion operation applied at the transmitter. The receiver may further include means for inserting dummy values into a sequence of bit metrics, thereby reversing a bit erasure operation at the transmitter. However, the bit metrics are not "hard" 1 or 0 values for individual bits. Rather, the bit metric represents the probability that the transmitted symbol included the predetermined value for that particular bit 0 in the examples given above. The bit metrics are real number values, similar to the real values which are propagated through the various stages of the QPSK receiver and presented to the Viterbi decoder as discussed above with reference to FIG. 13. These real values can be used in a "soft" decoding scheme, such as Viterbi decoding, in which the receiver decides on the most probable value of each bit in the reproduced information based on information contained in several bits sent through the transmission channel. Thus, the receiver preferably is adapted to receive signals representing transmitted data encoded in a convolutional code, and has decoding means including means for deconvoluting inverse to the convolutional code. The means for deconvoluting preferably includes means for deconvoluting according to a most-likely path decoding scheme such as a Viterbi decoder.

Typically, the ranges associated with the various bits denoted by a particular signal component are different from one another. For example, in the 16-QAM system discussed above, each component of the received signal varies over a first domain less than a first nominal value $(-3/\sqrt{10})$; a second domain between the first nominal value and a second nominal value (between $-3/\sqrt{10}$ and $-1/\sqrt{10}$); a third domain between the second nominal value $(-1/\sqrt{10})$ and a third nominal value $(1/\sqrt{10})$; a fourth domain between the third nominal value $(1/\sqrt{10})$ and a fourth nominal value $(3/\sqrt{10})$; and a fifth domain greater than the fourth nominal value (greater than $3/\sqrt{10}$). For one bit associated with the first component, the first range includes the first and second domains; the second range includes the fourth and fifth domains and the third range includes the third domain. In this arrangement, using the example of the 16-QAM system, the bit metric has the maximum value when the first component is below the second nominal value ($-1/\sqrt{10}$) and has the minimum value when the signal component has a value above the third nominal value ($1/\sqrt{10}$). When the signal component has a value between the second and third nominal values (between $-1/\sqrt{10}$ and $1/\sqrt{10}$) the bit metric has an intermediate value; as the signal component approaches the second or third nominal value bounding the third domain, the bit metric approaches the maximum or minimum value respectively.

For a second bit associated with the first component, the first range may include the third domain; the second range may include the first and fifth domains whereas the third range may include the second and fourth domains. Stated another way, for this additional bit, the bit metric has the maximum value when the signal component is between the second and third nominal values (between $-1/\sqrt{10}$ and $1/\sqrt{10}$); the bit metric has the minimum value when the signal component is below the first nominal value (below $-3/\sqrt{10}$) or above the fourth nominal value (above $3/\sqrt{10}$) but the bit metric has an intermediate value when the signal component is between the first and second nominal values (between $-3/\sqrt{10}$ and $-1/\sqrt{10}$) or when the signal component is between the third and fourth nominal values (between $1/\sqrt{10}$ and $3/\sqrt{10}$).

The receiver may further include means for serializing the components of the receive signals so that the components of each receive signal are input to the means for setting bit metrics one after another. Thus, only one device for determining the bit metrics need be provided. Alternatively, the number of devices for setting bit metrics may be equal to the number of components in each receive signal, typically 2.

Further aspects of the present invention include methods of receiving data including a series of multi-component signals as discussed above in connection with the apparatus. Methods according to this aspect of the present invention include the step of determining the value of each component in each received signal and setting a value of a bit metric for each bit denoted by each received signal based upon the value of the signal component associated with that bit. Here again, there are first, second and third ranges defined for each bit and the value setting step is performed for each bit so that the bit metric has a predetermined maximum value when the associated component of the signal is in the first range defined for the bit; so that the bit metric has a predetermined minimum value when the associated signal component is in the second range defined for the bit and so that the bit metric has an intermediate value between the maximum and minimum values when the associated signal component is in the third range defined for the bit. As discussed above in connection with the receiver, the step of setting values for bit metrics may be performed by interpolation when the value of a signal component is in the third range defined for the bit. Alternatively, the step of setting bit metrics may be performed by selecting an address in a memory for each bit of each received signal based upon the component of such received signal associated with that bit and reading out of the memory the bit metric stored at each selected address. Once again, different bit metrics are stored at different addresses in the memory. The method may further include the step of serializing the components of each received signal. The step of setting the bit metrics may be performed first for the bits associated with one component and then for the bits associated with another component of the same signal.

Methods in accordance with the foregoing aspects of the invention desirably further include the steps of processing the bit metrics and recovering reproduced data from the processed bit metrics. Most preferably, the bits represented by the received signals include transmitted data which constitutes the original data encoded in a convolutional code. The processing step most preferably includes the step of deconvoluting the bit metrics in a manner inverse to the convolutional code. The deconvoluting step desirably is performed so as to provide a "soft" or most-likelihood decoding, in which the value of each bit in the reproduced data depends upon the value of several bits in the transmitted data. The processing step may include the steps of forming one or more sequences of bit metrics and subjecting the bit metric sequences to bit diffusion reversal processing, bit insertion processing or both. As discussed above in connection with the apparatus, the methods allow the use of multi-value, multi-component transmission schemes, while maintaining all of the advantages afforded by bit diffusion, bit erasure and soft decoding.

The foregoing and other objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

Figure 1:
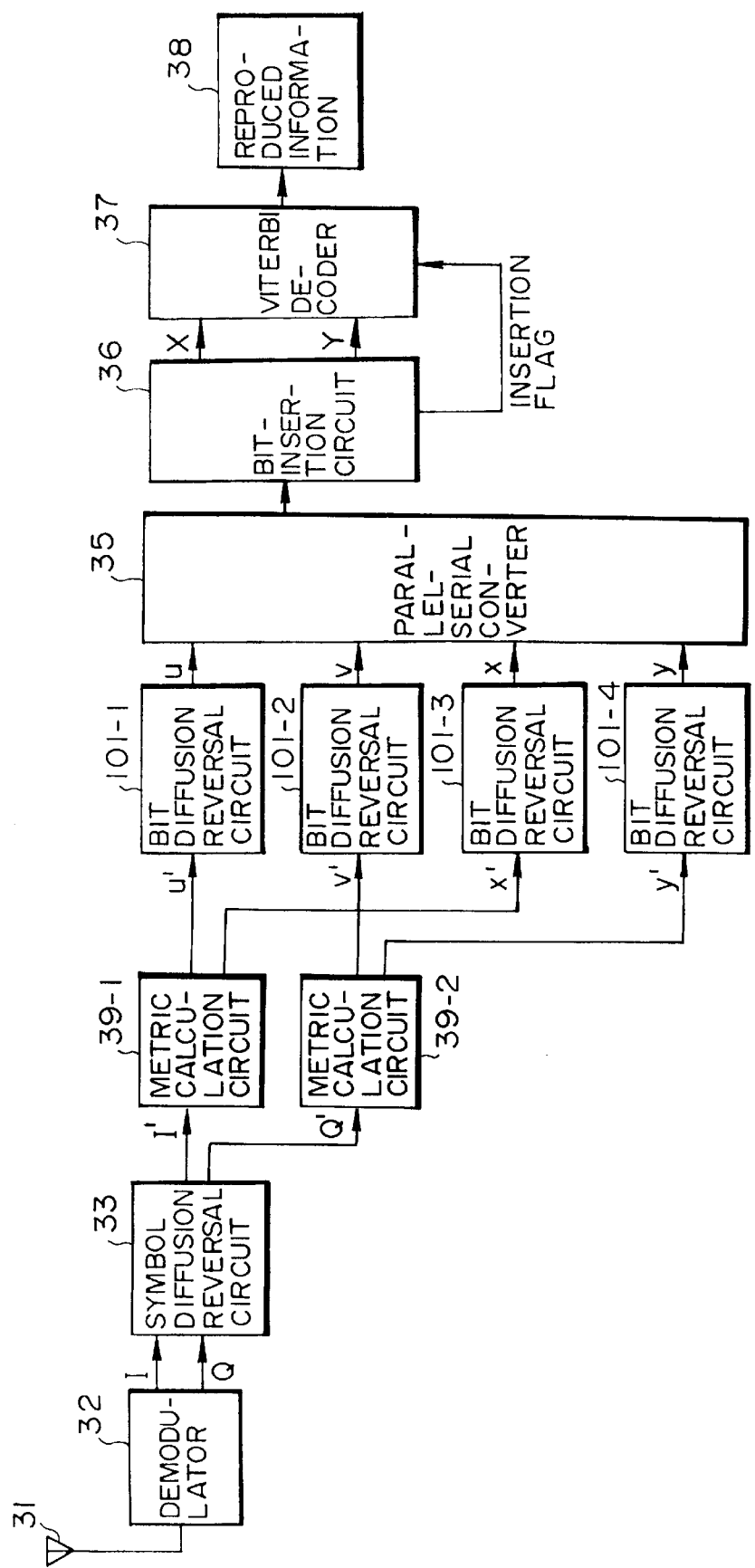
FIG. 1 is a block diagram showing the configuration of a first embodiment of the present invention.
Figure 13:
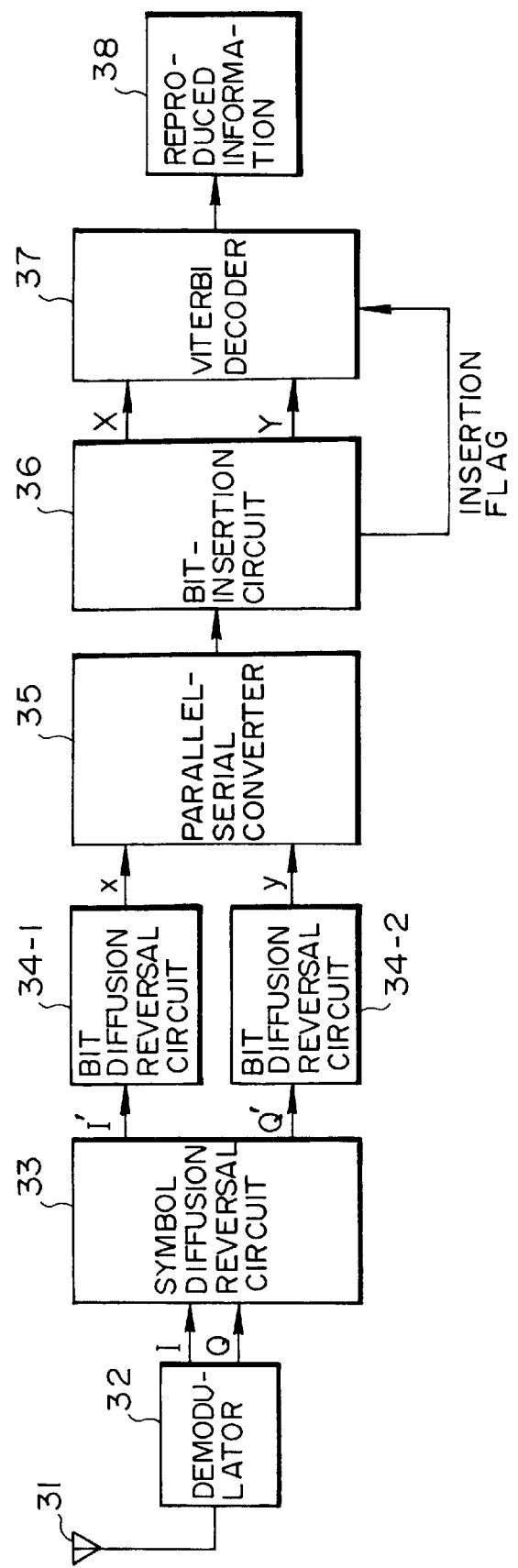
FIG. 13 is a block diagram showing the configuration of a conventional data receiver.
Figure 17:
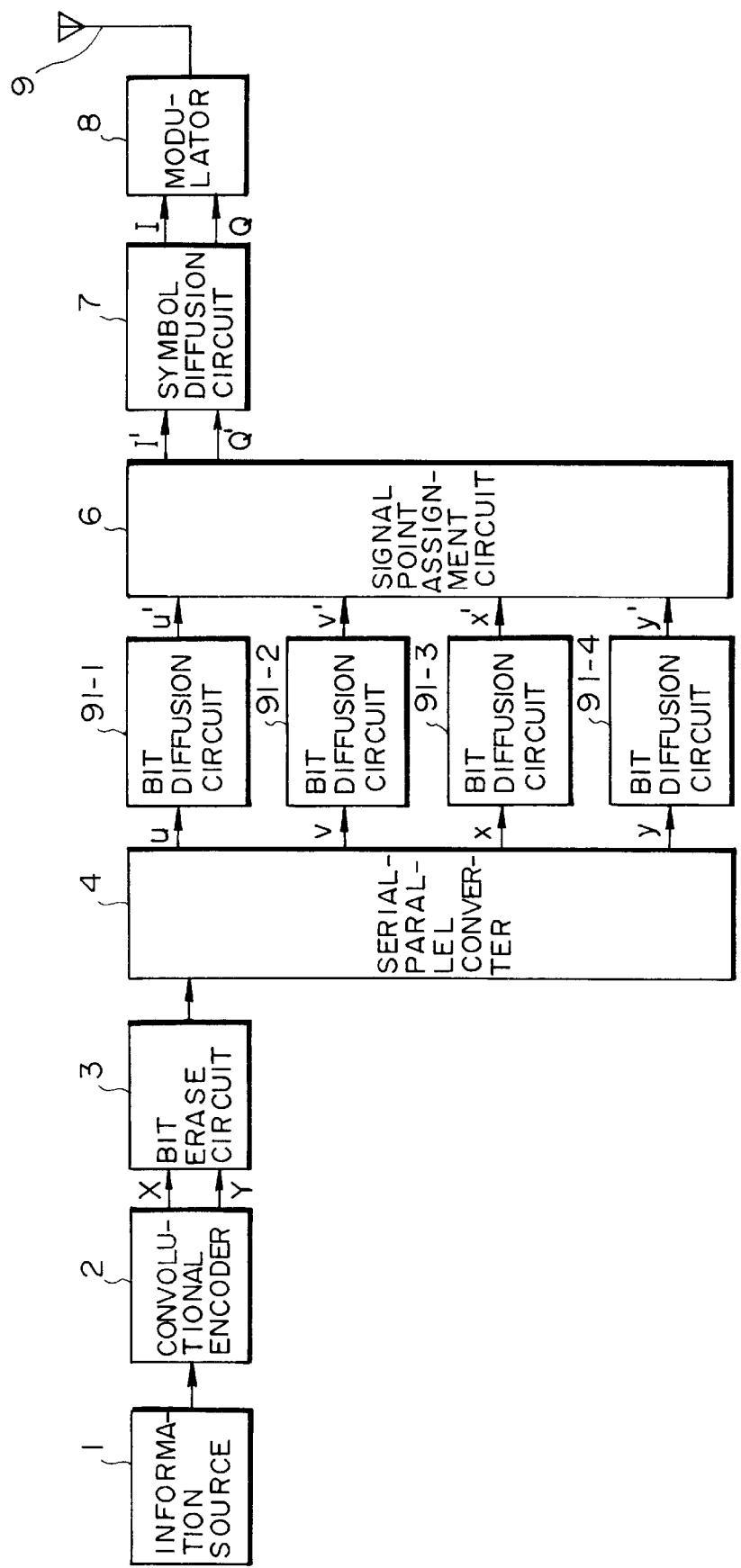
FIG. 17 is a block diagram showing the configuration of an example of a data transmitter using 16-QAM.

FIG. 1 shows a receiver in accordance with one embodiment of the invention. This receiver is arranged to receive data transmitted by the transmitter shown in FIG. 17. In FIG. 1, sections corresponding to those of the conventional data receiver shown in FIG. 13 are indicated by the same reference numerals. Those features not discussed below are the same as the corresponding features of the receiver shown in FIG. 13. The receiver includes an antenna 31 and demodulator 32 for recovering multi-component signals having I and Q components from a transmission path, and passing the I and Q component values to a symbol diffusion reversal circuit 33. The symbol diffusion reversal circuit is arranged to perform processing inverse to that in the symbol diffusion circuit 7 of the transmitter (FIG. 17). As discussed above, this reversal process restores the received signals to the order which the symbols had before processing in symbol diffusion circuit 7. The symbol diffusion reversal circuit outputs the reordered I and Q signal components I' and Q' to bit metric calculation circuits 39-1 and 39-2, respectively.

Bit metric calculation circuit 39-1 is arranged to calculate a metric u' for the first bit and a metric x' for the third bit of each received signal based on the value of the I component I' in that received signal. Circuit 39-1 outputs metric u' for the first bit to a bit diffusion reversal circuit 101-1 and outputs metric x' for the third bit to a bit diffusion reversal circuit 101-3.

Bit metric calculation circuit 39-2 is arranged to calculate a metric v' for the second bit and a metric y' for the fourth bit of each received signal based on the value of the Q component Q' in that received signal. Circuit 39-2 outputs metric v' for the second bit to a bit diffusion reversal circuit 101-2 and outputs metric y' for the fourth bit to a bit diffusion reversal circuit 101-4.

Figure 2:
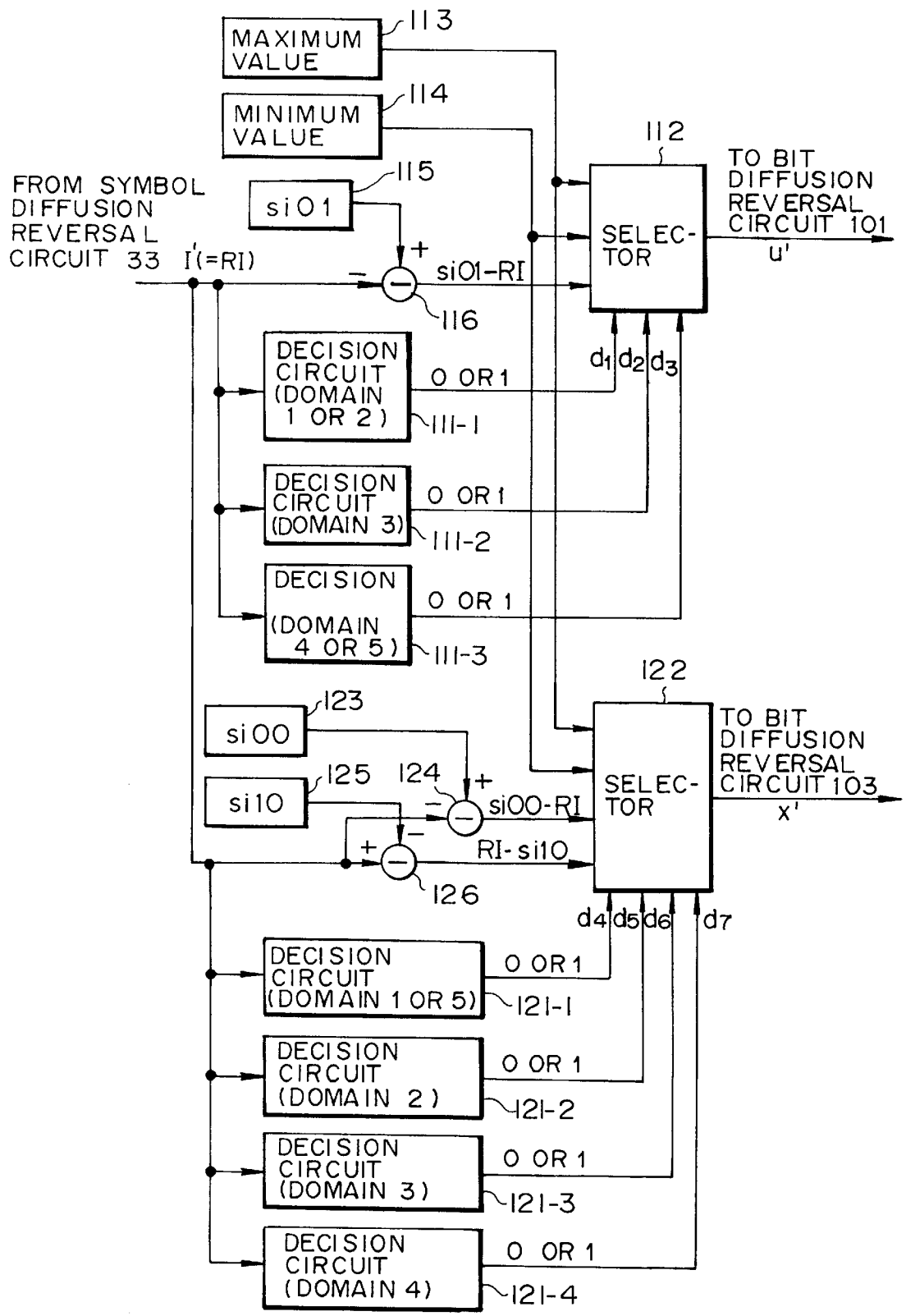
FIG. 2 is a block diagram showing the configuration of an example of the metric calculation circuit 39-1 shown in FIG. 1.

The configuration of the metric calculation circuit 39-1 is as shown in FIG. 2. The I component value signal I' output from the symbol diffusion reversal circuit 33 shown in FIG. 1 is input to decision circuits 111-1 to 111-3, and 121-1 to 121-4, as shown in FIG. 2.

Figure 18:
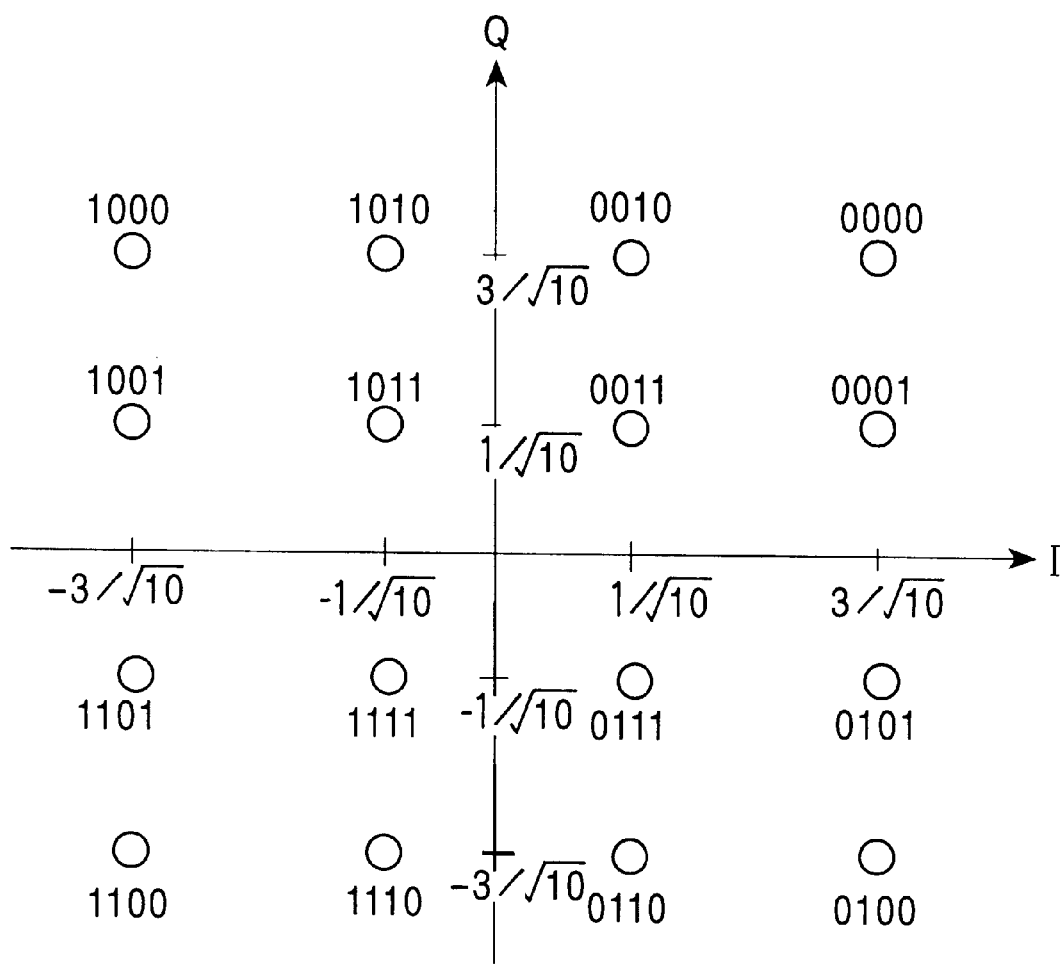
FIG. 18 is a diagram showing a signal constellation of 16-QAM.
Figure 19:
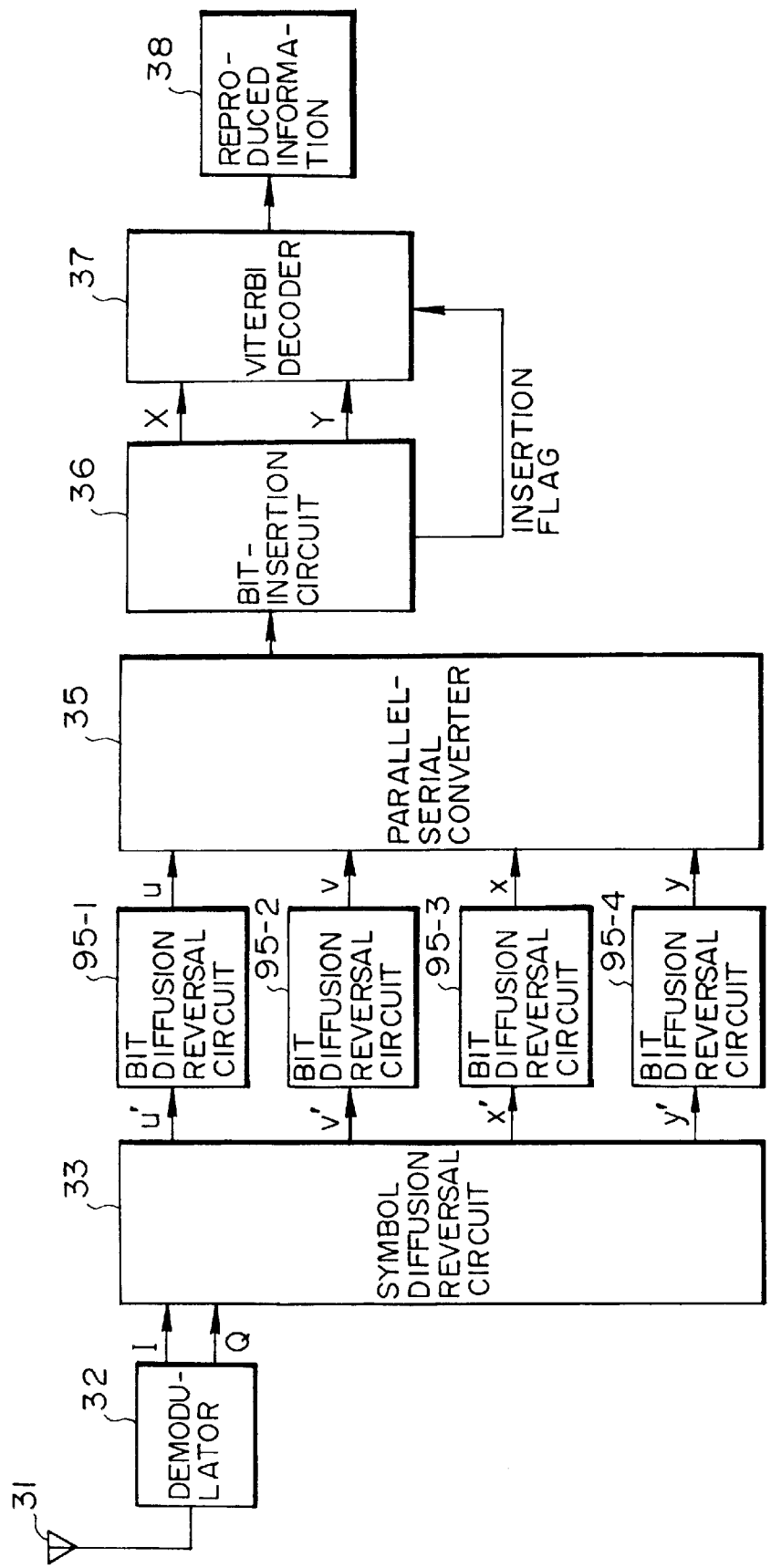
FIG. 19 is a diagram showing the configuration of a data receiver for receiving data transmitted by the transmitter shown in FIG. 17.

Because signal point assignment at the transmitter was performed in accordance with the 16-QAM symbol set, each received signal represents one to the 16 possible symbols in the 16-QAM signal constellation or overall symbol set of FIG. 18. Symbols having a nominal I component value of $3/\sqrt{10}$, corresponding to 16-QAM signal points 0000; 0001; 0101; and 0100 as shown in FIG. 18, form a symbol subset SI00 shown in FIG. 3. Symbols having a nominal I component value of $1/\sqrt{10}$, corresponding to 16-QAM signal points 0010; 0011; 0111; and 0110, form a symbol subset SI01 shown in FIG. 3.

Figure 3:
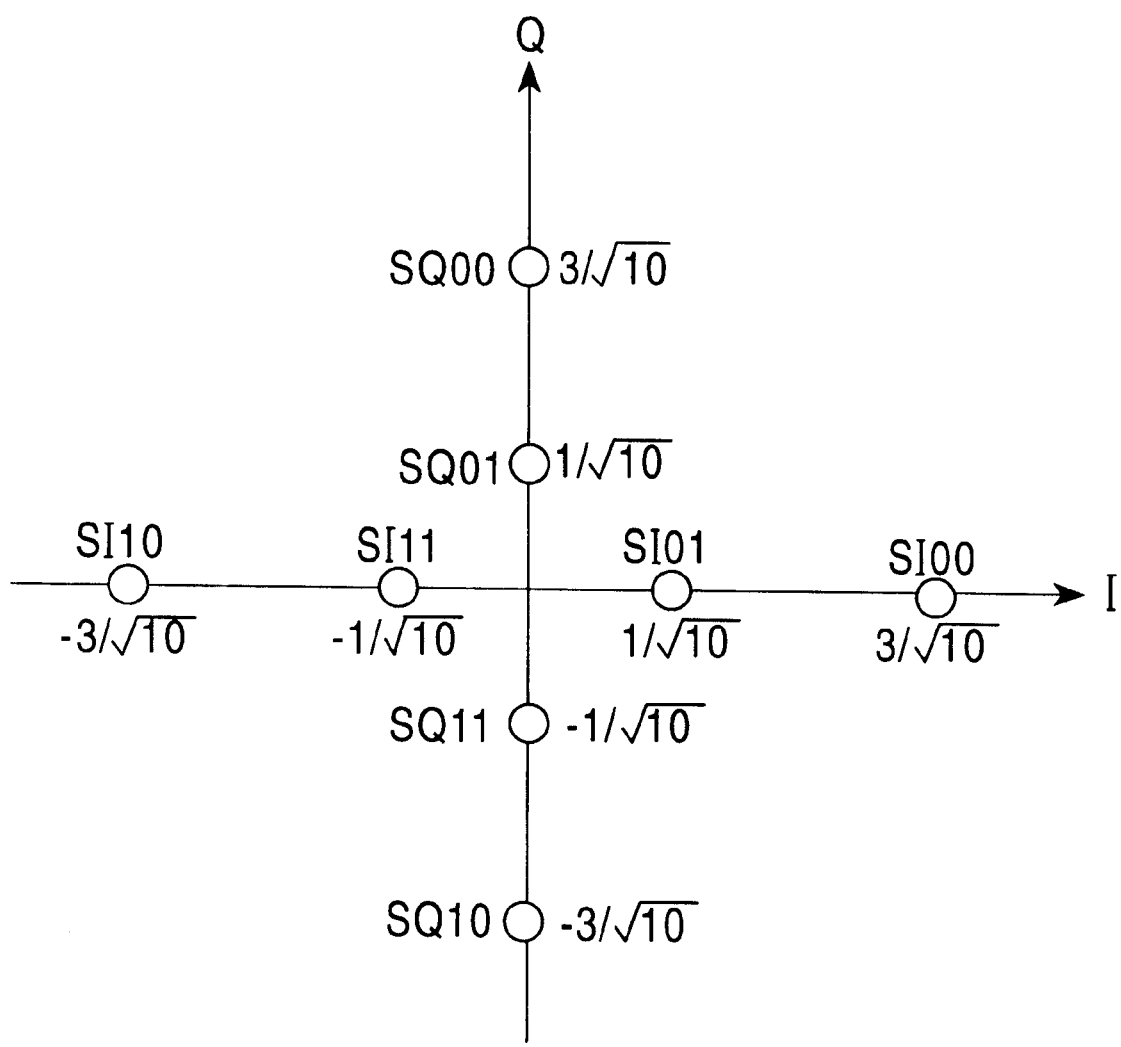
FIG. 3 is a diagram showing sets of symbols, the symbols in each set corresponding to in 16-QAM signal points defined by a common I or Q component value.

Symbols having an I component value of $-1/\sqrt{10}$, corresponding to 16-QAM signal points 1010; 1011; 1111; and 1110 as shown in FIG. 18, form a symbol subset SI11 shown in FIG. 3. Symbols having an I component value of $3/\sqrt{10}$, corresponding to 16-QAM signal points 1000; 1001; 1101; and 1100, form a symbol subset SI10 shown in FIG. 3.

Similarly, symbols having a Q component value of $3/\sqrt{10}$, corresponding to 16-QAM signal points 0000; 0010; 1010; and 1000 as shown in FIG. 18, form a symbol subset SQ00 shown in FIG. 3, and symbols having a Q component value of $1/\sqrt{10}$, corresponding to 16-QAM signal points 0001; 0011; 1011; and 1001, form a symbol subset SQ01 shown in FIG. 3.

Further, symbols having a Q component value of $-1/\sqrt{10}$, corresponding to 16-QAM signal points 0101; 0111; 1111; and 1101 as shown in FIG. 18, form a symbol subset SQ11 shown in FIG. 3, and symbols having a Q component value of $-3/\sqrt{10}$, corresponding to 16-QAM signal points 0100; 0110; 1110; and 1100, form a symbol subset SQ10 shown in FIG. 3.

Figure 4:
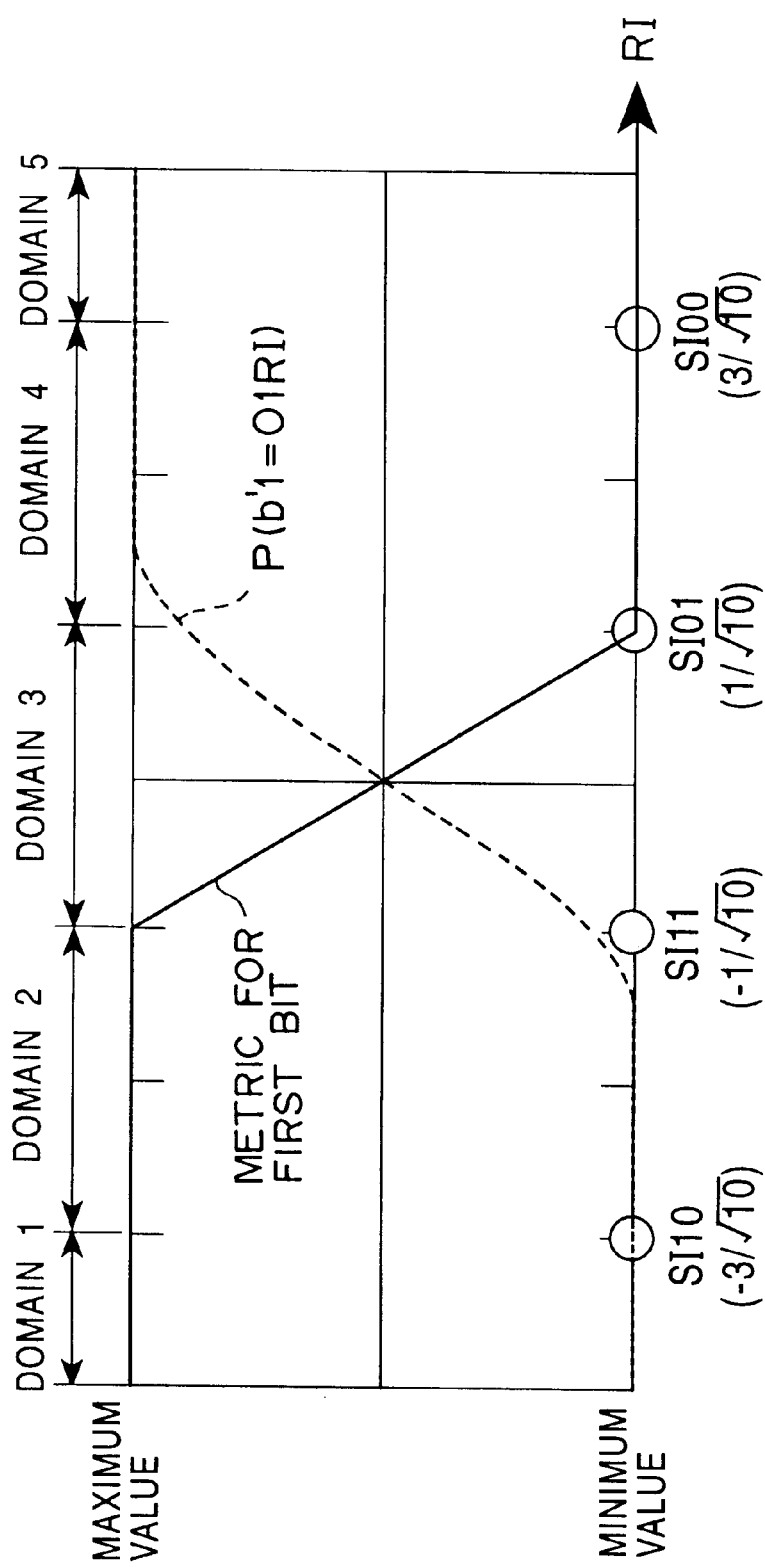
FIG. 4 is a diagram of an example of the relationship between the I component of a received signal and a metric for the first bit.

The decision circuit 111-1 determines whether the supplied I component value is equal to or smaller than the nominal I component value ($-1/\sqrt{10}$) of the symbols belonging to the set SI11 (that is, whether the I signal value is in a domain 1 or 2 shown in FIG. 4). If the decision circuit 111-1 determines that the I signal value is in the domain 1 or 2, it outputs 1 as a value of a decision bit d1 to a selector 112. If it determines that the I signal value is not in the domain 1 or 2, it outputs 0 to the selector 112.

The decision circuit 111-2 determines whether the supplied I signal value is equal to or smaller than the nominal I component value ($1/\sqrt{10}$) of the symbols belonging to the set SI01 and greater than the nominal I component value ($-1/\sqrt{10}$) of the symbols belonging to the set SI11 (that is, whether the I signal value is in a domain 3 shown in FIG. 4). If the decision circuit 111-2 determines that the I signal value is in domain 3, it outputs 1 as a value of a decision bit d2 to the selector 112. If it determines that the I signal value is not in domain 3, it outputs 0 to the selector 112.

The decision circuit 111-3 determines whether the supplied I signal value is greater than the nominal I component value ($1/\sqrt{10}$) of the symbols belonging to the set SI01 (that is, whether the I signal value is in domain 4 or domain 5 shown in FIG. 4). If the decision circuit 111-3 determines that the I signal value is in domain 4 or 5, it outputs 1 as a value of a decision bit d3 to the selector 112. If it determines that the I signal value is not in domain 4 or domain 5, it outputs 0 to the selector 112.

A constant generator circuit 115 supplies a value equal to the nominal I component value si01 of the symbols belonging to the symbol subset SI01, i.e., si01=$1/\sqrt{10}$ in this case. A subtracter circuit 116 calculates the difference (si01−RI) between the nominal si01 value supplied by constant generator circuit 115 and the value RI of the I component of the received signal supplied from the symbol diffusion reversal circuit 33, and outputs the calculation result to the selector 112.

The selector 112 outputs a value supplied from a constant generator circuit 113 (the maximum value of the metric, $2/\sqrt{10}$ in this case) if the values of the decision bits d1 to d3 supplied from the decision circuits 111-1 to 111-3 are (d1, d2, d3)=(1, 0, 0). This value is output as metric u' for the first bit of the data to the bit diffusion reversal circuit 101-1. The selector 112 outputs as metric u' a value supplied from a constant generator circuit 114 (the minimum value of the metric, 0 in this case) if the values of the decision bits d1 to d3 are (d1, d2, d3)=(0, 0, 1).

Also, the selector 112 outputs the value (si01−RI) calculated by the constant generator circuit 115 and the adder circuit (subtracter circuit) 116 if the values of the decision bits d1 to d3 are (d1, d2, d3)=(0, 1, 0). This value is output as metric u' for the first bit of the data to the bit diffusion reversal circuit 101-1.

Thus, as shown by the solid line denominated "Metric for First Bit" in FIG. 4, the bit metric u' will have a maximum value ($2/\sqrt{10}$) if the I' component of the received signal is in a first range composed of domains 1 and 2 in FIG. 4. The bit metric u' will be at a minimum (0) if the I' component of the received signal is in a second range composed of domains 4 and 5 in FIG. 4, whereas the bit metric u' will have a value between the minimum and maximum values if the I' component is in a third range, composed of domain 3 in FIG. 4. Thus, the ranges for the first (most significant) bit of the four bit data conveyed by each signal are defined by the circuit.

Figure 5:
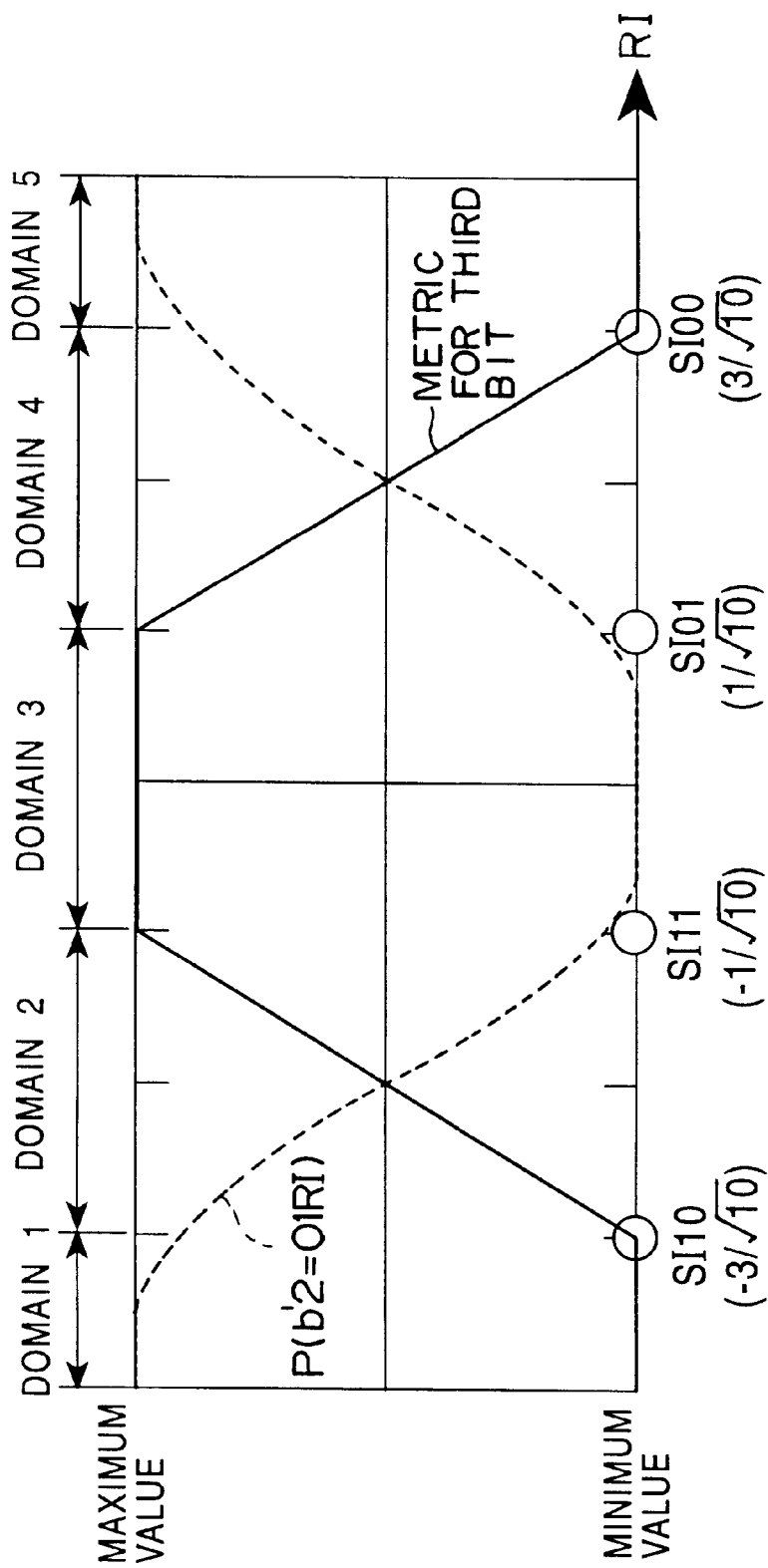
FIG. 5 is a diagram of an example of the relationship between the I component of a received signal and a metric for the third bit.

The decision circuit 121-1 determines whether the supplied I signal value is equal to or smaller than the nominal I component value ($-3/\sqrt{10}$) of the symbols belonging to the set SI10 or greater than the nominal I component value ($3/\sqrt{10}$) of the symbols belonging to the set SI00 (that is, whether the I signal value is in domain 1 or domain 5 shown in FIG. 5). If the decision circuit 121-1 determines that the I signal value is in domain 1 or domain 5, it outputs 1 as a value of a decision bit d4 to a selector 122. If it determines that the I signal value is not in domain 1 or domain 5, it outputs 0 to the selector 122.

The decision circuit 121-2 determines whether the supplied I signal value is equal to or smaller than the nominal I component value ($-1/\sqrt{10}$) of the symbols belonging to the set SI11 and greater than the nominal I component value ($-3/\sqrt{10}$) of the symbols belonging to the set SI10 (that is, whether the I signal value is in domain 2 shown in FIG. 5). If the decision circuit 121-2 determines that the I signal value is in domain 2, it outputs 1 as a value of a decision bit d5 to the selector 122. If it determines that the I signal value is not in domain 2, it outputs 0 to the selector 122.

The decision circuit 121-3 determines whether the supplied I signal value is equal to or smaller than the nominal I component value ($1/\sqrt{10}$) of the symbols belonging to the set SI01 and greater than the nominal I component value ($-1/\sqrt{10}$) of the symbols belonging to the set SI11 (that is, whether the I signal value is in domain 3 shown in FIG. 5). If the decision circuit 121-3 determines that the I signal value is in domain 3, it outputs 1 as a value of a decision bit d6 to the selector 122. If it determines that the I signal value is not in domain 3, it outputs 0 to the selector 122.

The decision circuit 121-4 determines whether the supplied I signal value is equal to or smaller than the nominal I component value ($3/\sqrt{10}$) of the symbols belonging to the set SI00 and greater than the nominal I component value ($1/\sqrt{10}$) of the symbols belonging to the set SI01 (that is, whether the I signal value is in domain 4 shown in FIG. 5). If the decision circuit 121-4 determines that the I signal value is in domain 4, it outputs 1 as a value of a decision bit d7 to the selector 122. If it determines that the I signal value is not in domain 4, it outputs 0 to the selector 122.

A constant generator circuit 123 provides a value equal to the nominal I component value si00 of the symbols belonging to the symbol subset SI00, i.e., si00=$3/\sqrt{10}$ in this case. A subtracter circuit 124 calculates the difference (si00−RI) between the nominal si00 value supplied from constant generator circuit 123 and the value RI of the I component of the received signal supplied from the symbol diffusion reversal circuit 33, and outputs the calculation result to the selector 122.

Another constant generator circuit 125 supplies a value equal to the nominal I component value si10 of the symbols belonging to the symbol subset SI10, i.e., si10=$-3/\sqrt{10}$ in this case. A subtracter circuit 126 calculates the difference (RI−si10) between the value RI of the I component of the received signal supplied from the symbol diffusion reversal circuit 33 and the nominal si10 value supplied from constant generator circuit 125, and outputs the calculation result to the selector 122.

The selector 122 outputs the value supplied from the constant generator circuit 114 (the minimum value of the metric, 0 in this case) if the values of the decision bits d4 to d7 supplied from the decision circuits 121-1 to 121-4 are (d4, d5, d6, d7)=(1, 0, 0, 0). This value is output as metric x' for the third bit of the data to the bit diffusion reversal circuit 101-3. The selector 122 outputs as metric x' the value supplied from the constant generator circuit 113 (the maximum value of the metric, $2/\sqrt{10}$ in this case) if the values of the decision bits d4 to d7 are (d4, d5, d6, d7)=(0, 0, 1, 0).

Also, the selector 122 outputs the value (RI−si10) calculated by the constant generator circuit 125 and the subtracter circuit 126 if the values of the decision bits d4 to d7 are (d4, d5, d6, d7)=(0, 1, 0, 0). This value is output as metric x' for the third bit of the data to the bit diffusion reversal circuit 101-3. The selector 122 outputs as metric x' the value (si00−RI) calculated by the constant generator circuit 123 and the subtracter circuit 124 if the values of the decision bits d4 to d7 are (d4, d5, d6, d7)=(0, 0, 0, 1).

Thus, as shown by the solid line denominated "Metric for Third Bit" in FIG. 5, the bit metric x' will have a maximum value ($2/\sqrt{10}$) if the I' component of the received signal is in a first-range composed of domain 3 in FIG. 5. The bit metric x' will be at a minimum (0) if the I' component of the received signal is in a second range composed of domains 1 and 5 in FIG. 5, whereas the bit metric x' will have a value between the minimum and maximum values if the I' component is in a third range, composed of domains 2 and 4 in FIG. 5. Here again, ranges for the third bit of the four bit data conveyed by each signal are defined by the circuit. As will be appreciated by comparison of FIGS. 4 and 5, the ranges defined for the first bit (for setting the first bit metric u' discussed above) and the ranges defined for the second bit (for setting the third bit metric x') differ from one another.

The metric calculation circuit 39-2 has the same configuration as that of the metric calculation circuit 39-1. However, metric calculation circuit 39-2 calculates metrics v' and y' for the second and fourth bits, respectively, of the data based on the value of the Q component of each received signal supplied from the symbol diffusion reversal circuit 33. Circuit 39-2 defines ranges for the second bit which are the same as the ranges for the first bit discussed above. Also, circuit 39-2 defines ranges for the fourth bit which are the same as the ranges for the third bit discussed above. Circuit 39-2 outputs the metrics v' and y' to the bit diffusion reversal circuits 101-2 and 101-4, respectively.

Each of the bit diffusion reversal circuits 101-i (i=1, . . . , 4) shown in FIG. 1 receives a sequence of bit metrics for the bit i supplied from the metric calculation circuit 39-1 or 39-2. Each bit diffusion reversal circuit is arranged to reorder the sequence of bit metrics so as to restore the original order of the bits in a manner inverse to the reordering performed by the bit diffusion circuit 91-i of the transmitter (FIG. 17). The bit diffusion reversal circuits 101-i supply the reordered sequences of bit metrics to a parallel-serial converter 35.

The parallel-serial converter 35 is arranged to convert four data sequences into one data sequence.

Bit insertion circuit 36 performs the operation inverse to that performed by the bit erase circuit 3 shown in FIG. 17. That is, the erase map shown above:

X: 10
Y: 11
is used to insert an arbitrary dummy data item (0 in this case) in the data sequence, and the data sequence is split into two sequences X and Y. The data input to insertion circuit 36 is provided by parallel-serial converter 35 in the order u1, v1, x1, y1, u2, v2, x2, y2 . . . . Dummy data items are inserted periodically at the positions immediately before every third bit in the data sequence, so that u1, 0, y1, 0, x2, . . .

are output as data X in this order, and v1, x1, u2, v2, y2, . . .

are also output as data Y in this order.

Data sequences X and Y are output from the bit insertion circuit 36 to a Viterbi decoder 37. Also, the bit insertion circuit provides a flag indicating the position of insertion of each dummy data item to the Viterbi decoder 37.

Figure 6:
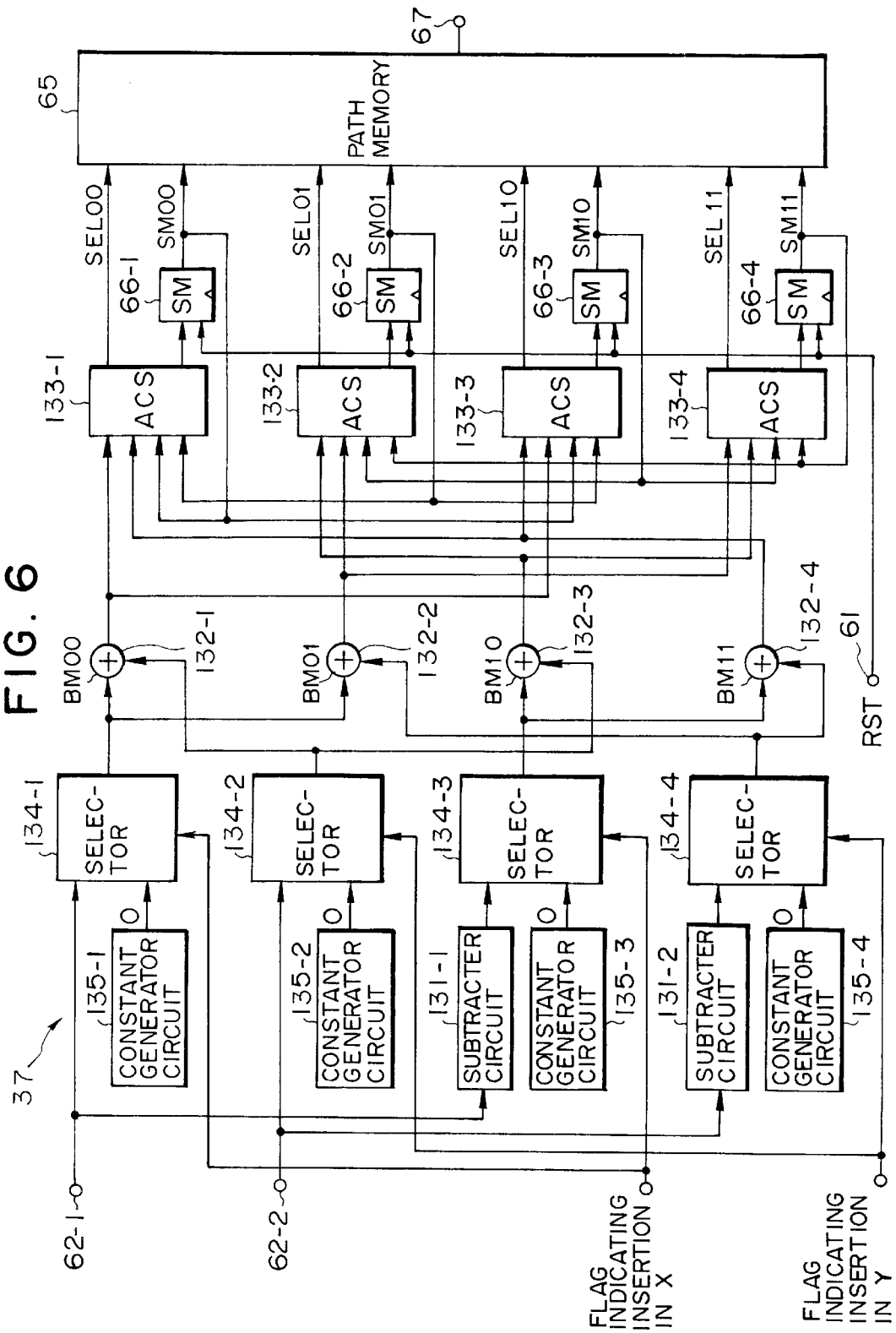
FIG. 6 is a block diagram showing the configuration of an example of the Viterbi decoder shown in FIG. 1.

FIG. 6 shows an example of the Viterbi decoder 37. In this example, data sequence X (the value corresponding to metric u for the first bit or metric x for the third bit) from a bit insertion circuit 36 is input to an input terminal 62-1 while data sequence Y (the value corresponding to metric v for the second bit or metric y for the fourth bit) from the bit insertion circuit 36 is input to an input terminal 62-2.

The value X input through the input terminal 62-1 is input to a selector 134-1 and to a subtracter circuit 131-1. The subtracter circuit 131-1 subtracts X from the maximum value of the bit metric, i.e., from $2/\sqrt{10}$ in this case, and outputs the difference to a selector 134-3. The value Y input through the input terminal 62-2 is input to a selector 134-2 and to a subtracter circuit 131-2. The subtracter circuit 131-1 subtracts Y from the maximum value of Y ($2/\sqrt{10}$) and outputs the difference to a selector 134-4.

The selector 134-1 is supplied with the value 0 which is output from a constant generator circuit 135-1 and the value X from the input terminal 62-1. When a flag indicating insertion in X is sent from the bit insertion circuit 36 and input to the selector 134-1, the selector 134-1 selects the value 0 generated by the constant generator circuit 135-1. When no flag indicating insertion in X is input, the selector 134-1 selects the value X. The selector 134-1 outputs the selected value to adder circuits 132-1 and 132-2.

The selector 134-2 is supplied with the value 0 which is output from a constant generator circuit 135-2 and the value Y from the input terminal 62-2. When a flag indicating insertion in Y is sent from the bit insertion circuit 36 and input to the selector 134-2, the selector 134-2 selects the value 0 generated by the constant generator circuit 135-2. When no flag indicating insertion in Y is input, the selector 134-2 selects the value Y. The selector 134-2 outputs the selected value to adder circuits 132-1 and 132-3.

The selector 134-3 is supplied with the value 0 which is output from a constant generator circuit 135-3 and the value which is obtained by subtracting the value X from the maximum value of X which is output from the subtracter circuit 131-1. When a flag indicating insertion in X is sent from the bit insertion circuit 36 and input to the selector 134-3, the selector 134-3 selects the value 0 generated by the constant generator circuit 135-3. When no flag indicating insertion in X is input, the selector 134-3 selects the value obtained by subtracting the value X from the maximum value of X. The selector 134-3 outputs the selected value to adder circuits 132-3 and 132-4.

The selector 134-4 is supplied with the value 1 which is output from a constant generator circuit 135-4 and the value which is obtained by subtracting the value Y from the maximum value of Y and which is output from the subtracter circuit 131-2. When a flag indicating insertion in Y is sent from the bit insertion circuit 36 and input to the selector 134-4, the selector 134-4 selects the value 1 generated by the constant generator circuit 135-4. When no flag indicating insertion in Y is input, the selector 134-4 selects the value obtained by subtracting the value Y from the maximum value of Y. The selector 134-4 outputs the selected value to adder circuits 132-2 and 132-4.

The adder circuit 132-1 calculates the sum of the value supplied from the selector 134-1 and the value supplied from the selector 134-2, and outputs the sum as a branch metric BM00. The adder circuit 132-2 calculates the sum of the value supplied from the selector 134-1 and the value supplied from the selector 134-4, and outputs the sum as a branch metric BM01. Similarly, the adder circuit 132-3 calculates the sum of the value supplied from the selector 134-2 and the value supplied from the selector 134-3, and outputs the sum as a branch metric BM10, and the adder circuit 132-4 calculates the sum of the value supplied from the selector 134-3 and the value supplied from the selector 134-4, and outputs the sum as a branch metric BM11.

The output BM00 of the adder circuit 132-1 and the output BM11 of the adder circuit 132-4 are input to ACS circuits 133-1 and 133-3. The output BM01 of the adder circuit 132-2 and the output BM10 of the adder circuit 132-3 are input to ACS circuits 133-2 and 133-4.

An output SM00 from a state metric storage 66-1 and an output SM00 from a state metric storage 66-2 are also input to the ACS circuits 133-1 and 133-3. An output SM10 from a state metric storage 66-3 and an output SM11 from a state metric storage 66-4 are also input to the ACS circuits 133-2 and 133-4.

The ACS circuits 133-1 to 133-4 calculate new state metrics from the input branch and state metrics by adding these metrics together, and output the results of calculation to the state metric storages 66-1 to 66-4, and also output information SEL00 to SEL11 corresponding to a selected path to a path memory 65.

Figure 14:
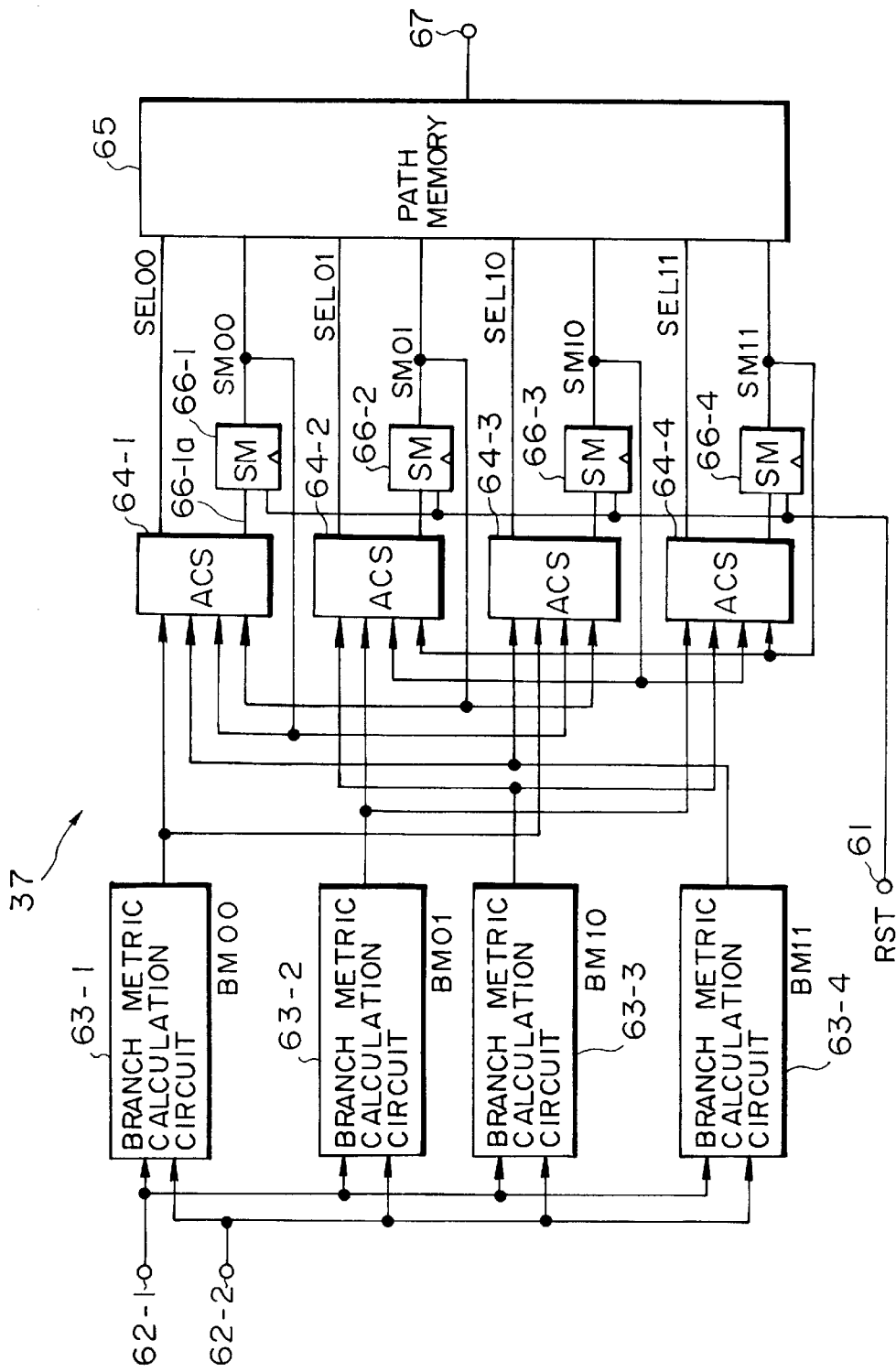
FIG. 14 is a block diagram showing the configuration of an example of the Viterbi decoder shown in FIG. 13.
Figure 15:
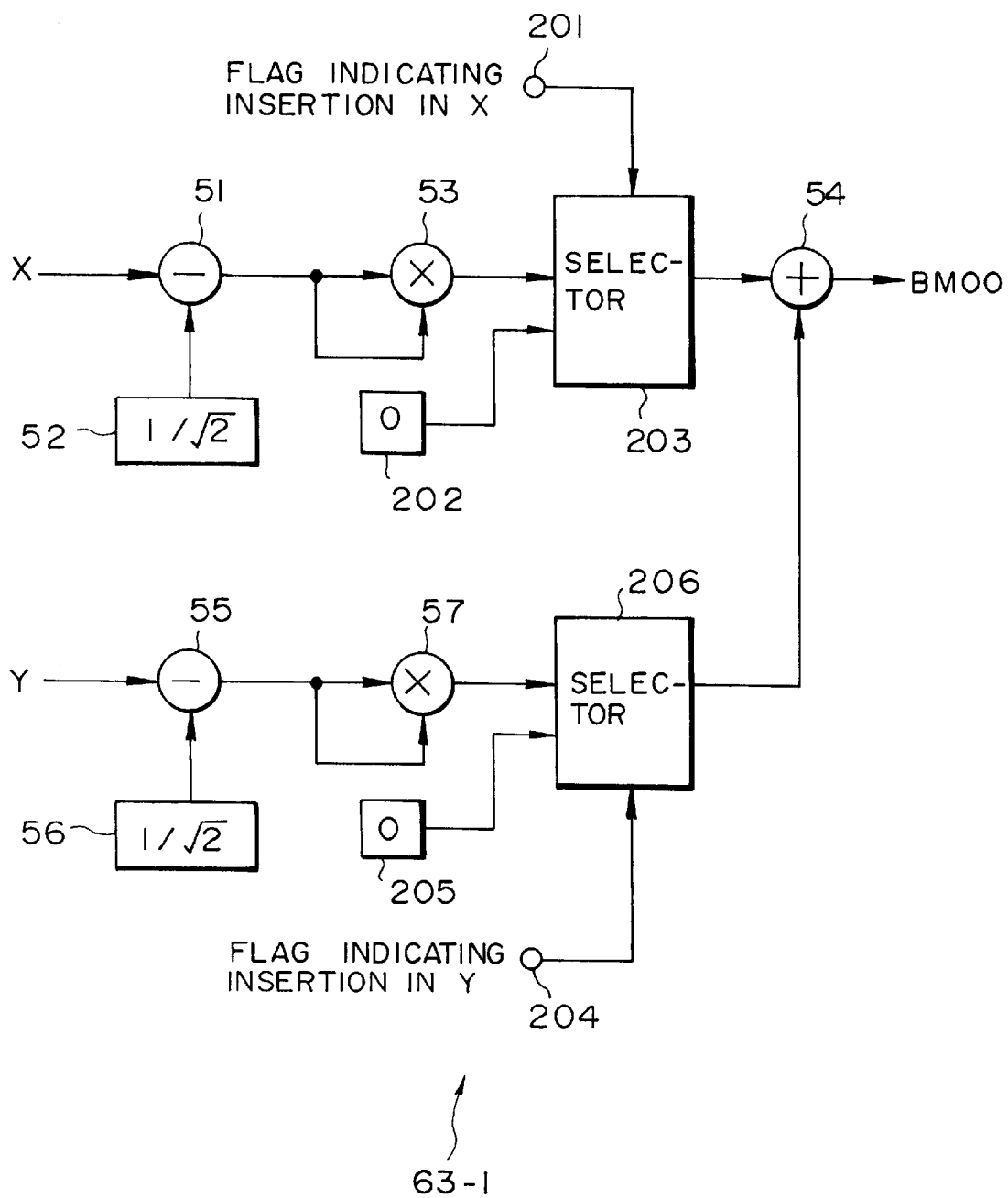
FIG. 15 is a block diagram showing the configuration of an example of the branch metric calculation circuit shown in FIG. 14.
Figure 16:
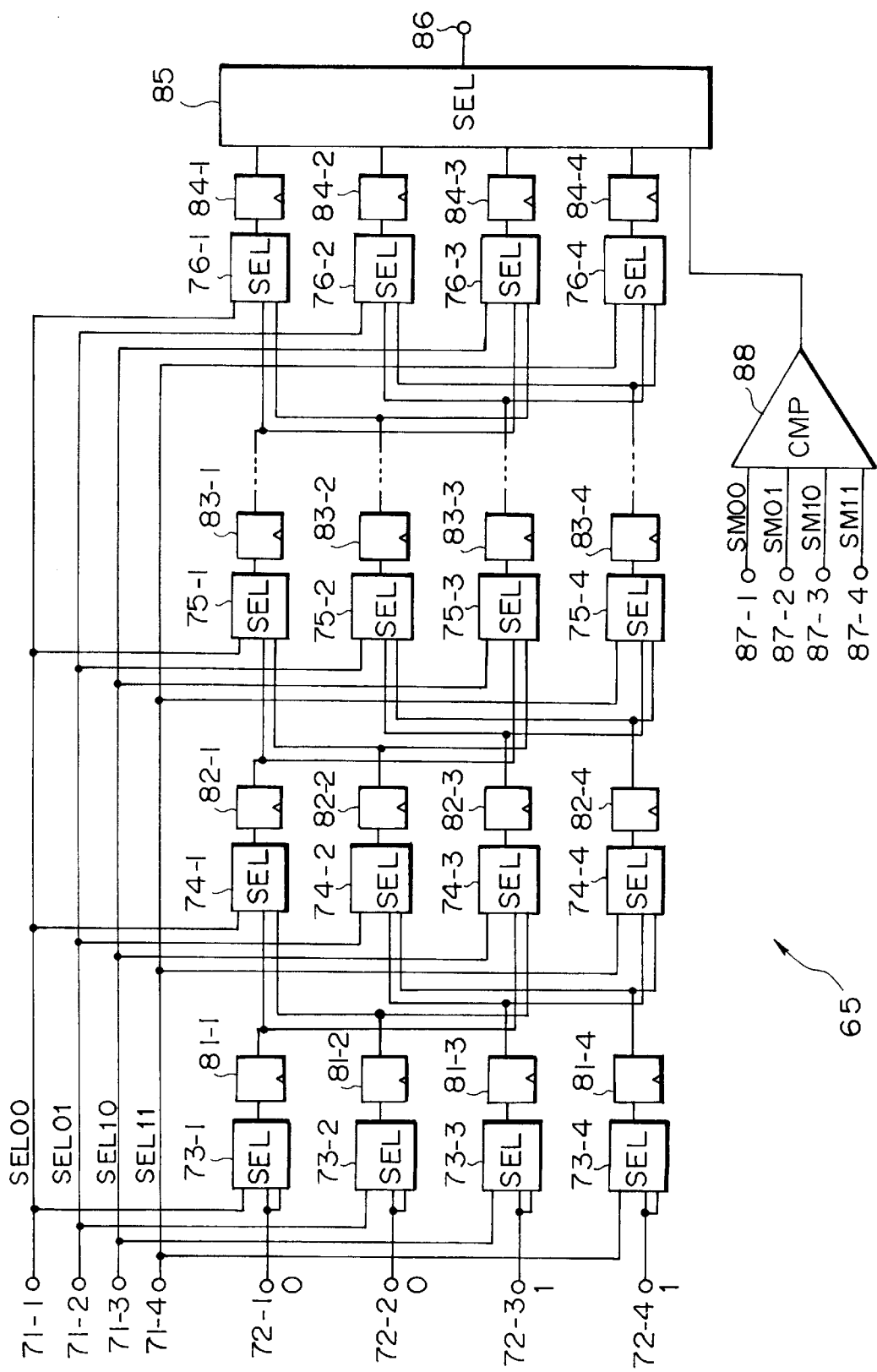
FIG. 16 is a block diagram showing the configuration of an example of the path memory shown in FIG. 14.

In other respects, the configuration of the Viterbi decoder 37 of this embodiment is the same as that shown in FIG. 14. Therefore, no further description will be given of it.

Excepting the above, the configuration of the data receiver shown in FIG. 1 is the same as that shown in FIG. 13. Therefore, no further description will be given of it. In a method according to the invention, the data receiver shown in FIG. 1 is operated to receive transmitted data sent from the transmitter of FIG. 17.

The demodulator 32 demodulates a signal received by the antenna 31 and outputs data in the form of I and Q components of received signals to the symbol diffusion reversal circuit 33. The symbol diffusion reversal circuit 33 processes the I and Q component data by symbol diffusion reversal processing and outputs I component I' to the metric calculation circuit 39-1 and Q component Q' to the metric calculation circuit 39-2.

The metric calculation circuit 39-1 calculates metrics u' and x' for the first and third bits denoted by each of the received signals from the supplied I component I'. Circuit 39-1 outputs metric u' for the first bit to the bit diffusion reversal circuit 101-1 and metric x' for the third bit to the bit diffusion reversal circuit 101-3.

Similarly, the metric calculation circuit 39-2 calculates metrics v' and y' for the second and fourth bits denoted by each received signal from the supplied Q component Q'. Circuit 39-2 outputs metric v' for the second bit to the bit diffusion reversal circuit 101-2 and metric y' for the fourth bit to the bit diffusion reversal circuit 101-4.

Metric calculation in the metric calculation circuits 39-1 and 39-2 will next be described. The bit metrics calculated by these circuits closely approximate a conditional posterior probability prescribed in the following expression with respect to each of bits forming a predetermined received signal when the signal is received.

$$P(bi=0|R)=P(bi=0 \cap R)/P(R) \quad (3)$$

In this equation, P(bi=0|R) represents the conditional posterior probability that the bit i (bi) (the first, second, third or fourth bit) of a transmitted symbol is 0 when received signal R(I, Q) is received, P(R) represents the probability of signal R(I, Q) being received, and P(bi=0∩R) represents the probability of transmission of a symbol in which the bit i is 0 and reception of received signal R(I, Q).

Similarly, the conditional posterior probability that the bit i of a transmitted symbol is 1 when received signal R(I, Q) is received can be obtained by the following equation:

$$P(bi=1|R)=P(bi=1 \cap R)/P(R) \quad (4)$$

In this equation, P(bi=1|R) represents the conditional posterior probability that the bit i of a transmitted symbol is 1 when received signal R(I, Q) is received, and P(bi=1∩R) represents the probability of transmission of a symbol in which the bit i is 1 and reception of received signal R(I, Q).

The conditional posterior probability that the bit i of a transmitted symbol is 1 when received signal R(I, Q) is received can also be obtained by the following equation:

$$P(bi=1|R)=1-P(bi=0|R) \quad (5)$$

In this embodiment, the metric calculation circuit 39-1 calculates metrics for the first and third bits of a symbol from the I component of a received signal while the metric calculation. circuit 39-2 calculates metrics for the second and fourth bits of the symbol from the Q component.

The curve shown in broken lines in FIG. 4 shows a probability P(b'1=0|RI) that the first bit b'1 of the sequence of bits denoted by the I component RI of received signal R is 0, versus the value of the I component. That is, the curve in broken lines is a graph of the probability that the transmitted symbol belongs to subset SI01 or SI00 (FIG. 3) versus the value of the I component in the received signal. This probability is equal to the conditional posterior probability (=P(b1=0|R) for the first symbol bit.

As shown by the solid line in FIG. 4, the bit metric for the first bit of data is inversely correlated with the probability denoted by the broken line(=P(b1=0|R). Thus, the bit metric for the first bit is set to a maximum value when the I component RI of the received signal is in domain 1 or 2 (corresponding to smaller values of probability P(b'1=0|RI)), i.e., when the value of the I component is in the first range defined for the first bit. The bit metric for the first bit of data is set to a minimum value when the I component of the received signal is in the domain 4 or 5 corresponding to greater values of probability P(b'1=0|RI), i.e., when the value of the I component is in the second range. Stated another way, the bit metric is directly correlated with P(b'1=1|RI).

When the value of the I component of the received signal is in the domain 3 (third range) corresponding to the range of probability P(b'1=0 RI) in which probability P(b'1=0 RI) changes substantially as the value of the I component changes, the bit metric for the first bit of data is calculated by linear interpolation in accordance with an expression:

$$\|si01-RI\| \quad (6)$$

$\|a-b\|$ represents the Euclidian distance between a and b. In this case, since si01 and RI are scalars, $\|si01-RI\|$ is equal to $|si01-RI|$ (the absolute value of (si01-RI).

With respect to the domain 3, probability P(b'1=0|RI) is approximated by the following exponential function:

$$P(b'1=0|RI)=A \exp(-B\|RI-SI01\|) \quad (7)$$

Probability P(b'1=1|RI) when the first bit b'1 is 1 can also be approximated by the following exponential function:

$$P(b'1=1|RI)=A \exp(-B\|RI-SI11\|) \quad (8)$$

Strictly speaking, it is necessary that an equation:

$$P(b'1=0|RI)+P(b'1=1|RI)=1 \quad (9)$$

is satisfied. However, when the value of the I component of the received signal is in the domain 3, suitable constants A and B are selected to effect approximation. The linear approximation of expression (6) closely approximates the value of the probability P(b'1=1|RI) calculated according to the exponential expression (8), multiplied by a constant $(2/\sqrt{10})$.

Since the Viterbi decoder 37 selects a maximum likelihood path according to the magnitudes of metrics, it is not particularly necessary to select any particular fixed constants A and B in equations (8) and (9) with respect to all the metrics. Stated another way, the results achieved by the Viterbi decoder are not affected where all of the bit metrics are multiplied by the same constant. For the same reason, a value obtained by multiplying the logarithm of the above-described probability P(b'1=0|RI) by −1 can be treated as a bit metric.

In this embodiment, therefore, the value $\|RI-SI01\|$ is used as a metric for b'1=0 in domain 3. Also, the value $\|RI-SI11\|$ can be used as a metric for b'1=1 in the domain 3.

The curve shown in broken lines in FIG. 5 is a graph of the probability P(b'2=0|RI) that the second bit b'2 denoted by the I component RI of received signal R is 0. The second bit b'2 denoted by the I component of the received signal is the third bit of the four bits denoted by the received signal. Thus, P(b'2=0|RI)=P(b3=0|R).

As shown by the solid line in FIG. 5, the bit metric for the third bit of data is set to the maximum value when the value of the I component RI of the received signal is in domain 3, the first range defined for bit b3, where the probabilities P(b'2=0|RI) and hence P(b3=0|RI) are at a minimum. Conversely, the bit metric for the third bit of data is set to the minimum value when the alue of the I component of the received signal is in domain 1 or 5, the second range defined for bit b3, where the probabilities P(b'2=0|RI) and P(b3=0|RI)are at a maximum. Here again, the bit metric is inversely correlated with the probability that a 0 bit value was sent as the bit in question (P(b3=0|RI)).

When the value of I component of the received signal is in the domain 2 (part of the third range defined for bit b3) where the probabilities P(b'2=0|RI) and (P(b3=0|RI) change rapidly with variation in the value RI, the bit metric for the third bit of data is calculated by linear interpolation in accordance with an expression:

$$\|RI-SI10\| \quad (10)$$

With respect to the domain 2, probability P(b'2=0|RI) is approximated by the following exponential function:

$$P(b'2=0|RI)=A2 \exp(-B2\|RI-SI10\|) \quad (11)$$

The probability P(b'2=1|RI) when the second bit b'2 is 1 can also be approximated by the following exponential function:

$$P(b'2=1|RI)=A2\ exp(-B2\|RI-SI11\|) \qquad (12)$$

Here again, since the Viterbi decoder 37 selects a maximum likelihood path according to the magnitudes of metrics, it is not particularly necessary to select particular fixed constants A2 and B2 in equations (11) and (12) with respect to all the metrics. For the same reason, a value obtained by multiplying the logarithm of the above-described probability P(b'2=0|RI) by −1 can be treated as a metric.

Therefore, the value $\|RI-SI10\|$ is used as a metric for b'2=0 in the domain 2. Also, the value $\|RI-SI11\|$ can be used as a metric for b'2=1. Here again, the linear expression approximates the more exact exponential expression for the probability.

When the I component of the received signal is in domain 4, another part of the third range defined for bit b3 (bit b'2) in which probabilities P(b'2=0|RI) and P(b3=0|RI) change rapidly with change in the value of the I component of the received signal, the metric for the third bit of data is calculated by linear interpolation in accordance with an expression:

$$\|SI00-RI\| \qquad (13)$$

With respect to the domain 4, probability P(b'2=0|RI) is approximated by the following exponential function:

$$P(b'2=0|RI)=A3\ exp(-B3\|RI-SI10\|) \qquad (14)$$

The opposite probability P(b'2=1|RI) that bit b'2 (bit b3) is 1 can also be approximated by the following exponential function:

$$P(b'2=1|RI)=A3\ exp(-B3\|RI-SI11\|) \qquad (15)$$

Once again, since the Viterbi decoder 37 selects a maximum likelihood path according to the magnitudes of metrics, it is not particularly necessary to select any particular fixed constants A3 and B3 in equations (14) and (15) with respect to all the metrics. For the same reason, a value obtained by multiplying the logarithm of the above-described probability P(b'2=0|RI) by −1 can be treated as a metric.

Therefore, the value $\|RI-SI00\|$ is used as a metric for b'2=0 in the domain 4. Also, the value $\|RI-SI01\|$ can be used as a metric for b'2=1.

The metric calculation circuit 39-2 calculates metrics for the second and fourth bits of data in the same manner as the metric calculation circuit 39-1.

As described above, a predetermined maximum value, a predetermined minimum value and values calculated by linear interpolation are used as metric values. Therefore, the bit metrics can be obtained only by simple arithmetic operations, thus enabling high-speed processing with a small, relatively simple circuit as discussed above with reference to FIG. 2.

Metrics u', v', x', and y' thus calculated by the metric calculation circuits 39-1 and 39-2 undergo bit diffusion reversal processing performed by the bit diffusion reversal circuits 101-1 to 101-4 and are thereafter converted from the from of four data sequences into the form of one data sequence by the operation of the parallel-serial converter 35. The resulting data sequence is subjected to bit insertion processing and converted to two data sequences X and Y using the erase map as discussed above.

The Viterbi decoder 37 performs Viterbi decoding in accordance with the state transition of the convolutional encoder 2 to obtain reproduced information 38. That is, the Viterbi decoder performs a decoding operation inverse to the convolutional encoding performed by encoder 2. The operation of the Viterbi decoder 37 will next be described in detail.

The selectors 134-1 and 134-3 output the value 0 to nullify the branch metric probability calculation of dummy data when supplied with a dummy data item inserted in X in the bit insertion circuit 36 and when supplied with the flag indicating insertion in X.

Also, the selectors 134-2 and 134-4 output the value 0 to nullify the branch metric probability calculation of dummy data when supplied with a dummy data item inserted in Y in the bit insertion circuit 36 and when supplied with the flag indicating insertion in Y.

That is, because branch metric calculation by the adder circuits 132-1 to 132-4 and state metric calculation by the ACS circuits 122-1 to 122-4 are each performed as addition (described below), the value 0 is output in place of a dummy data item to prevent influence by the dummy data item on the result of the branch metric calculation.

On the other hand, when no dummy data item is inserted in X, the value X supplied from the bit insertion circuit 36 is supplied to the adder circuits 132-1 and 132-2 via the selector 134-1, and the value obtained by subtracting the value X from the maximum value of X is supplied to the adder circuits 132-3 and 132-4.

Similarly, when no dummy data item is inserted in Y, the value Y supplied from the bit insertion circuit 36 is supplied to the adder circuits 132-1 and 132-3 via the selector 134-2, and the value obtained by subtracting the value Y from the maximum value of Y is supplied to the adder circuits 132-2 and 132-4.

The adder circuit 132-1 calculates the sum of the data X corresponding to the probability that the first bit of the output from the bit insertion circuit 36 is 0 or that the third bit is 0 and the data Y corresponding to the probability that the second bit is 0 or that the fourth bit is 0, and outputs the sum as branch metric BM00. This branch metric BM00 corresponds to the code output 00 of the convolutional encoder 2.

Similarly, the adder circuit 132-2 calculates the sum of (i) value X corresponding to the probability that the first bit of the output from the bit insertion circuit 36 is 0 or that the third bit is 0 and (ii) the value of the difference between Y and the maximum value of Y, which difference corresponds to the probability that the second bit is 1 or that the fourth bit is 1. Adder circuit 132-2 outputs the sum as branch metric BM01. This branch metric BM01 corresponds to the code output 01 of the convolutional encoder 2.

The adder circuit 132-3 calculates the sum of (i) the difference between X and the maximum value of X, which difference corresponds to the probability that the first bit of the output from the bit insertion circuit 36 is 1 or that the third bit is 1 and (ii) the value Y corresponding to the probability that the second bit is 0 or that the fourth bit is 0. Circuit 132-3 outputs the sum as branch metric BM10. This branch metric BM10 corresponds to the code output 10 of the convolutional encoder 2.

The adder circuit 132-4 calculates the sum of (i)the difference between X and the maximum value of X, which difference corresponds to the probability that the first bit of the output from the bit insertion circuit 36 is 1 or that the third bit is 1 and (ii) the difference between Y and the maximum value of Y, which difference corresponds to the probability that the second bit is 1 or that the fourth bit is 1. Circuit 132-4 outputs the sum as branch metric BM11. This branch metric BM11 corresponds to the code output 11 of the convolutional encoder 2.

When a dummy data item inserted in X or Y is supplied, the corresponding one of the selectors 132-1 to 132-4 selects 0 instead of the dummy data item, so that the adder circuits 132-1 to 132-4 output as branch metrics the input values not corresponding to the dummy data item without changing them. That is the adder circuits add 0 to the input values which do not correspond to the dummy data.

The ACS circuits 133-1 to 133-4 operate in the same manner as the ACS circuits 64-1 to 64-4 shown in FIG. 14 to update the values of state metrics SM01 to SM11.

In other respects, the Viterbi decoder 37 operates in the same manner as that shown in FIG. 13. Therefore, no further description will be given of the operation of the Viterbi decoder 37.

In a receiver according to a further embodiment of the invention, the metric calculation circuits 39-1 and 39-2 in the first embodiment are replaced by memories.

Figure 7:
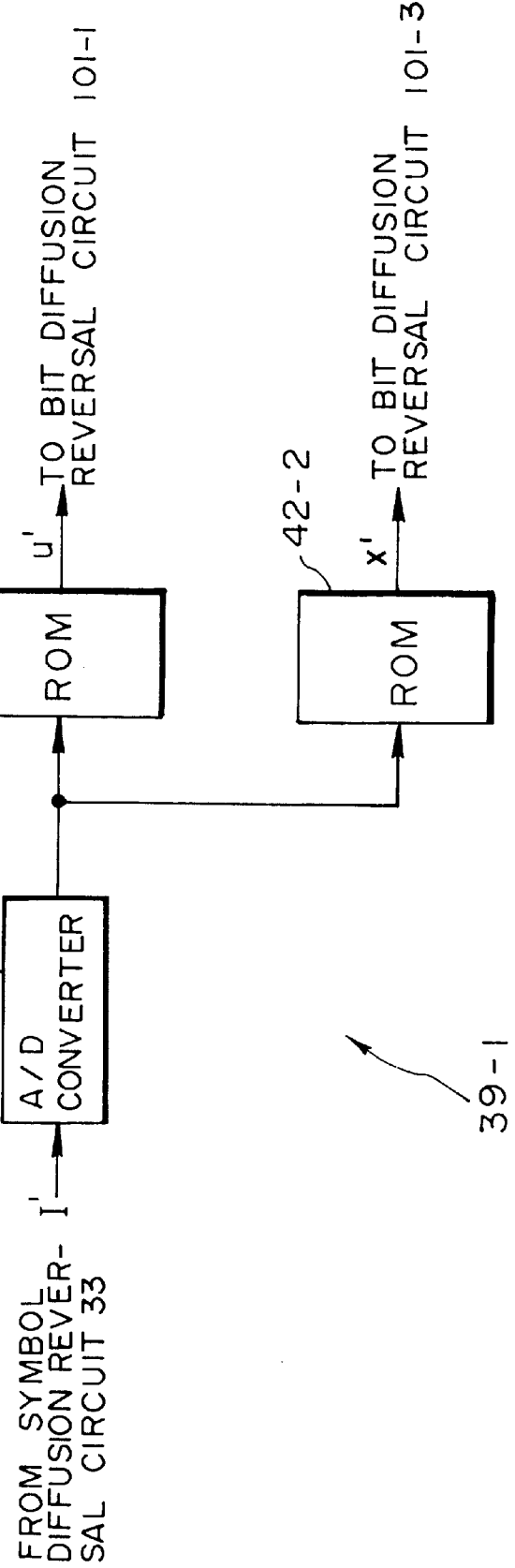
FIG. 7 is a block diagram showing the configuration of another example of the metric calculation circuit 39-1.

Metric calculation circuit 39-1 is replaced by read-only memories (ROMs) 42-1 and 42-2, in conjunction with an analog-to-digital converter 41 shown in FIG. 7. Analog to digital (A/D) converter 41 converts the I component signal supplied from the symbol diffusion reversal circuit 33 into a digital value and outputs the digital value as address data to the ROMs 142-1 to 142-4.

The ROM 42-1 outputs a value stored with the address designated by the supplied digital value (i.e., metric u' for the first bit corresponding to the I component value), and the ROM 42-2 outputs a value stored with the address designated by the supplied digital value (i.e., metric x' for the second bit corresponding to the I component value). The values of the bit metrics stored at the various addresses in ROM'S 42-1 and 42-2 are selected so that, for any value of the I component in the received signal, the bit metrics u' and x' read out from the ROM's will be the same as that which would be calculated by circuit 39-1 for the same value of the I component.

Metric calculation circuit 39-2 discussed above may be replaced by a similar assembly of ROMs and an A/D converter. The value of the Q component is supplied as an address, and the bit metrics v' and y' are read out. The A/D converters may be omitted if the I and Q components are converted to digital words at the demodulator or at another location upstream from the metric calculation circuits.

Figure 8:
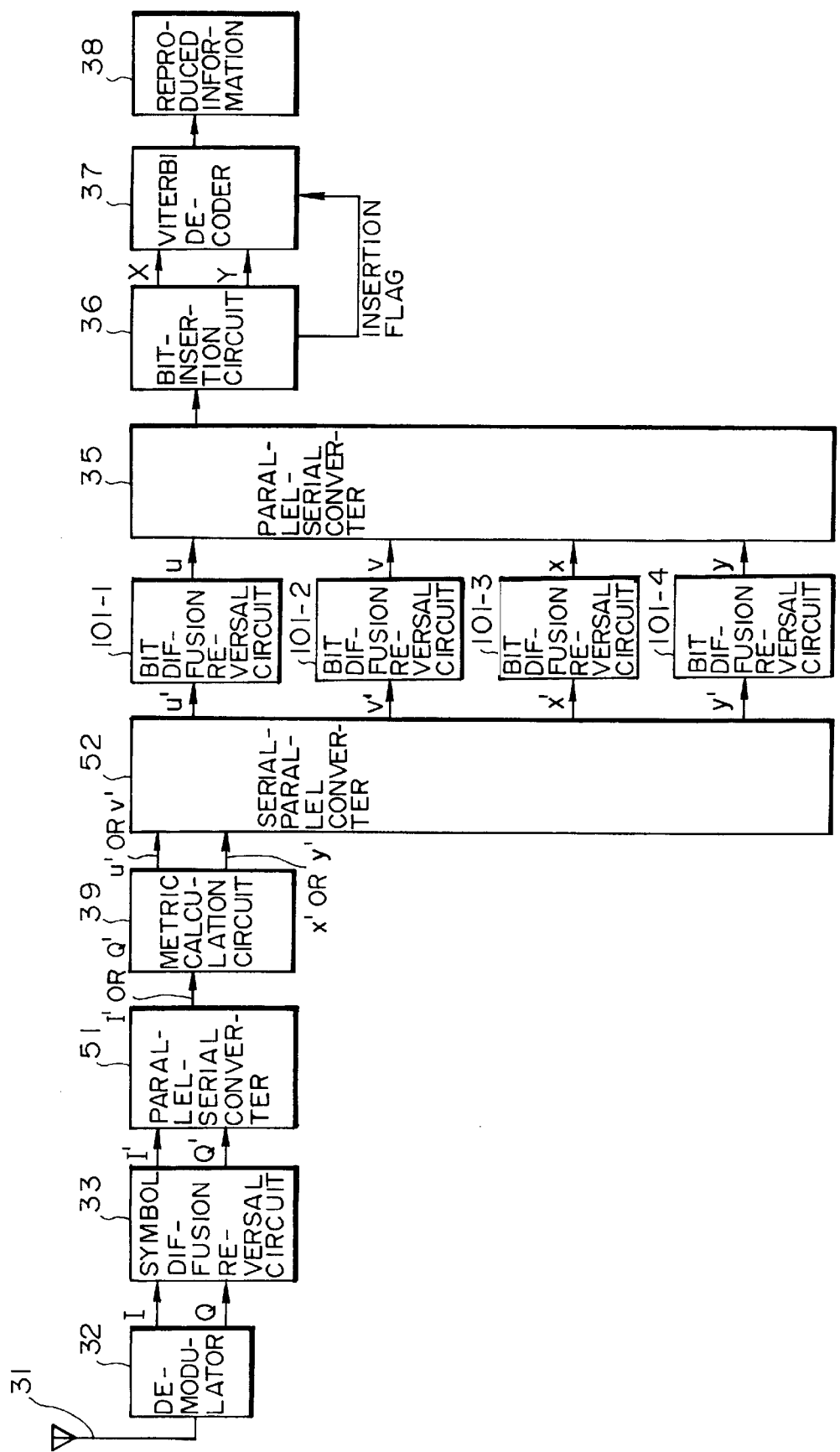
FIG. 8 is a block diagram showing the configuration of a second embodiment of the present invention.
Figure 9:
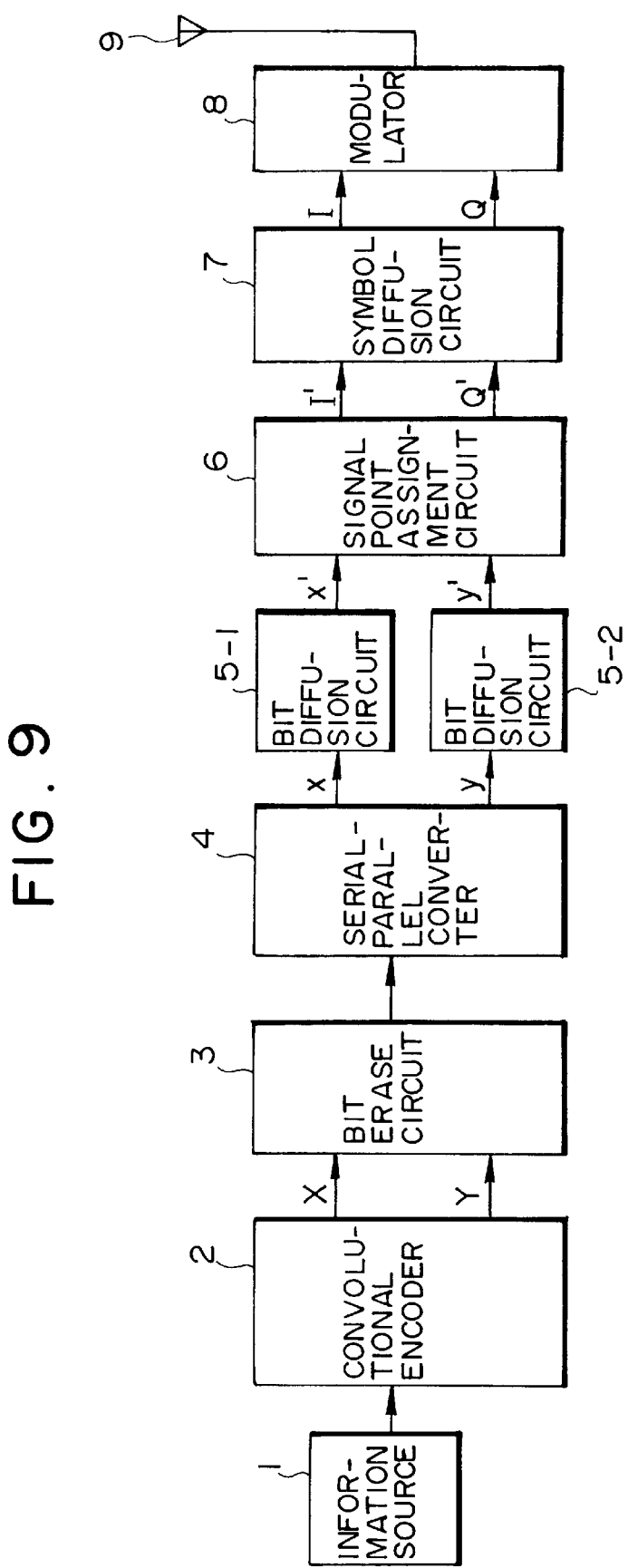
FIG. 9 is a block diagram showing the configuration of a conventional data transmitter.
Figure 10:
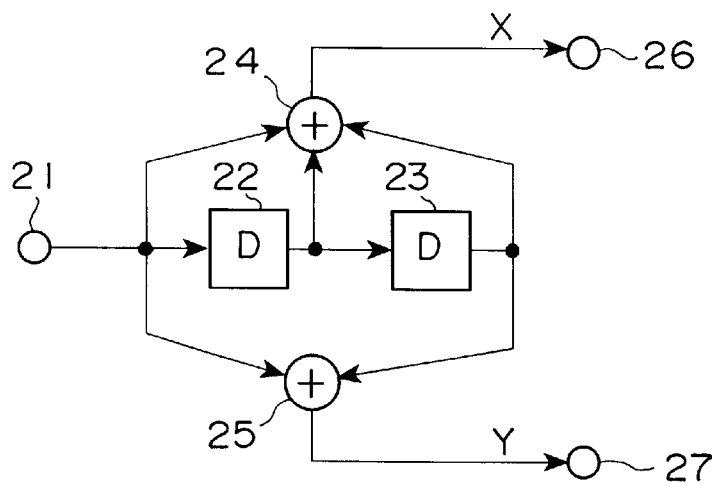
FIG. 10 is a block diagram showing the configuration of an example of the convolutional encoder shown in FIG. 9.
Figure 11:
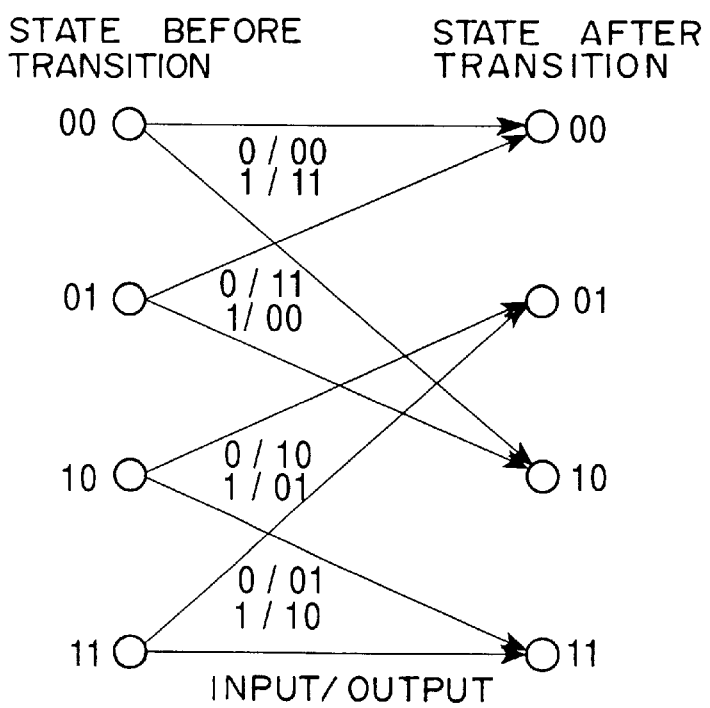
FIG. 11 is a diagram for explaining state transition of the convolutional encoder shown in FIG. 10.
Figure 12:
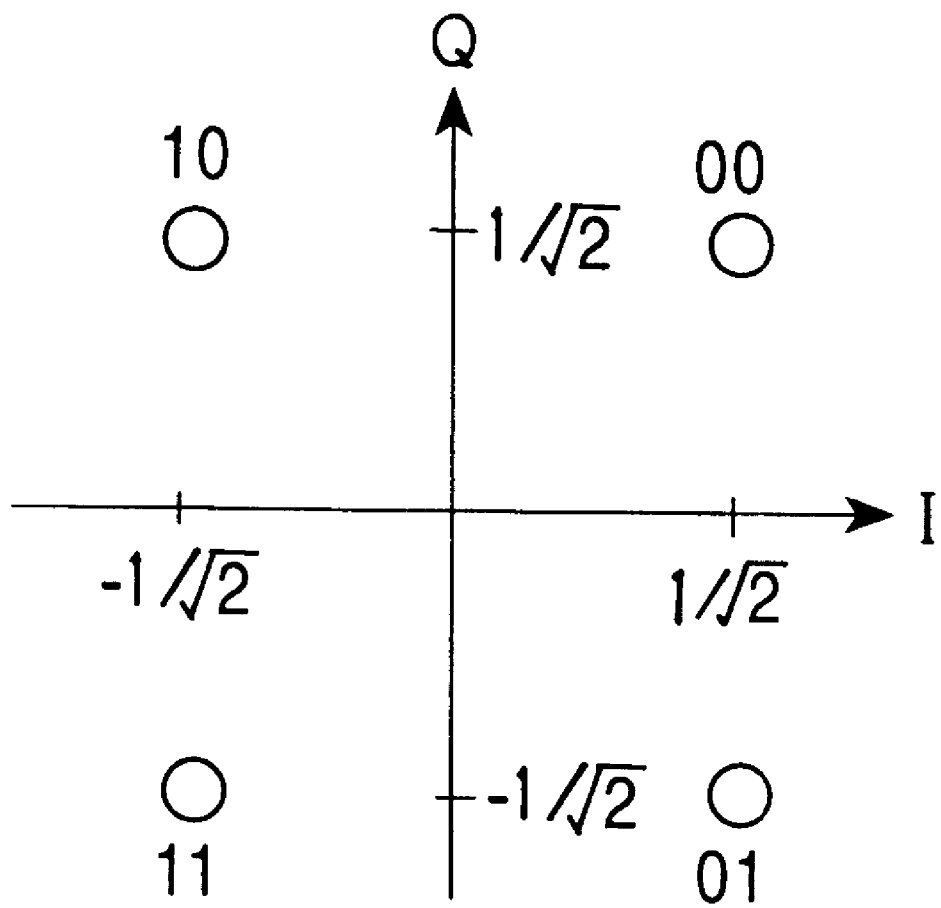
FIG. 12 is a diagram showing a signal constellation of QPSK.

FIG. 8 shows a data receiver in accordance with a further embodiment of the present invention. In the second embodiment, a parallel-serial converter 51, a metric calculation circuit 39 and a serial-parallel converter 52 are used in place of the two metric calculation circuits 39-1 and 39-2 of the embodiment discussed above with reference to FIG. 1.

The parallel-serial converter 51 converts two sequences of I component signal I' and Q component signal Q' supplied from the demodulator 32 into one data sequence and outputs this data sequence to the metric calculation circuit 39.

The metric calculation circuit 39 is arranged in the same manner as the above-described metric calculation circuits 39-1, shown in FIG. 2. Alternatively, the metric calculation circuit may be a memory-based device as discussed above with reference to FIG. 7. When the metric calculation circuit 39 is supplied with the I component signal, it calculates metric u' for the first bit and metric x' for the third bit of the corresponding symbol, outputs the results of calculation to the serial-parallel converter 52. When the metric calculation circuit 39 is supplied with the Q component signal, it calculates metric v' for the second bit and metric y' for the fourth bit of the symbol, outputs the results of calculation to the serial-parallel converter 52.

The serial-parallel converter 52 outputs metrics u' and x' for the first and third bits or metrics v' and y' for the second and fourth bits from the metric calculation circuit 39 to the bit diffusion reversal circuits 101-1 and 101-3 or to the bit diffusion reversal circuits 101-2 and 101-4.

In the embodiment of FIG. 8 only one metric calculation circuit 39 is used to calculate the metrics for the first to fourth bit, so that the size of the circuit can be reduced.

In the above-described embodiments, data modulated in accordance with a 16-QAM modulation scheme is demodulated and decoded. However, the present invention is also useful with other multi-value multi-component modulation systems such as 64-QAM or 256-QAM in which each symbol denotes more than two bits. The present invention also can be applied to still other multi-value, multi-component modulation systems. In some of these systems, the pattern of variation of bit values for one component is different from the pattern of variation of bit values for the other component. Thus, the ranges defined for the bits associated with one component may differ from the ranges defined for the bits associated with the other component. Also, a different number of bits can associated with each component of the signal can one component may denote only one bit. Further, although conventional modulation systems use two orthogonal components, the present invention can be applied to modulation systems having a greater number of components in each transmitted signal. Multi-component modulation systems are also known as multi-phase modulation systems.

The present invention can be employed with any transmission medium. Thus, although the transmitters and receivers discussed above employ electromagnetic (radio) waves as the transmission medium, the invention can also be used with optical transmission media, such as in encoding and decoding data sent in a fiber optic transmission system.

Any other bit diffusion algorithms and/or symbol diffusion algorithms, and the corresponding bit diffusion reversal and symbol diffusion reversal processes, can be used in place of the bit diffusion and symbol diffusion processes and reversal processes used in the embodiments discussed above. Likewise, other bit erasing and bit inserting processes can be substituted for those shown. In still further embodiments, features such as bit diffusion, symbol diffusion and/or bit erasing can be omitted from the transmitter, and in this case the corresponding reversal process is omitted from the receiver.

The Viterbi decoders discussed above can be replaced by other types of decoders. Where a convolutional code is employed, the decoder most preferably is a most likely path decoder, i.e., a decoder which determines the content of the reproduced data by determining the most likely path or series of states represented by the received data. The decoder circuit and other circuits described above can be replaced in whole or in part by programmable microprocessors programmed to perform equivalent functions.

The disclosure of the copending, commonly assigned United States Patent Application of Tamotsu Ikeda entitled APPARATUS AND METHOD FOR RECEIVING DATA USING BIT METRICS and claiming priority of Japanese Patent Applications P08-231745 and P08-233058 and the disclosure of the copending, commonly assigned United States Patent Application of Tamotsu Ikeda entitled APPARATUS AND METHOD FOR RECEIVING DATA WITH BIT INSERTION, and claiming priority of Japanese Patent Application P08-233057, both of said United States Patent Applications being filed on even date herewith, are hereby incorporated by reference herein.

As these and other variations and combinations of the features discussed above can be utilized without departing from the present invention, the foregoing description of the preferred embodiments should be taken as illustrating, rather than as limiting, the invention as defined by the claims.

What is claimed is:

1. A data receiver for receiving data including a series of multi-component signals representing symbols selected from a set of possible multi-component, multi-value symbols, each component of said signal denoting values of a plurality of bits, each bit being associated with one component of said signal, said receiver comprising:

means for determining the value of each component in each received signal; and means for setting a value of a bit metric for each bit denoted by said signal based upon the value of the signal component associated with that bit, there being first, second and third ranges defined for each bit, said value-setting means being operative to set the bit metric for each bit so that:

(a) the bit metric has a predetermined maximum value when the component associated with the bit is in the first range defined for that bit;

(b) the bit metric has a predetermined minimum value when the component associated with the bit is in the second range defined for that bit; and (c) the bit metric has an intermediate value between said maximum and minimum values when the component associated with the bit is in the third range defined for the bit.

2. A receiver as claimed in claim 1 wherein said means for setting is operative to set the bit metric for each bit denoted by each received signal so that the bit is correlated with the probability that the received signal represents a transmitted symbol denoting a first value of that bit.

3. A receiver as claimed in claim 2 wherein said first value is 0.

4. A receiver as claimed in claim 1 or claim 2 wherein said means for setting is operative to set the bit metric for each bit by interpolation between said minimum and maximum values when the associated component of the received signal is in the third range defined for that bit.

5. A receiver as claimed in claim 1 or claim 2 wherein said means for setting said bit metric include:

(a) a memory having stored therein a set of bit metrics, different bit metrics being stored at different addresses in said memory; and (b) means for selecting an address in said memory for each bit of each received signal based upon the component of such received signal associated with that bit, said memory being operative to read out the bit metric stored at each selected address.

6. A receiver as claimed in claim 1 or claim 2 wherein a first component in the received signal varies over a first domain less than a first nominal value; a second domain between said first nominal value and a second nominal value; a third domain between said second nominal value and a third nominal value; a fourth domain between said third nominal value and a fourth nominal value; and a fifth domain greater than said fourth nominal value, and wherein said first range for a first bit associated with said first component includes said first and second domains; said second range for said first bit includes said fourth and fifth domains; and said third range for said first bit includes said third domain.

7. A receiver as claimed in claim 6 wherein said first range for another bit associated with said first component includes said third domain; said second range for said another bit includes said first and fifth domains; and said third range for said another bit includes said second and fourth domains.

8. A data receiver according to claim 1 or claim 2 further comprising means for serializing the components of said signal so that the components of each signal are input to said means for setting bit metrics one after another.

9. A receiver as claimed in 1 or claim 2 or claim 3 further comprising decoding means to process said bit metrics and recover transmitted data therefrom.

10. A receiver as claimed in claim 9 wherein said means for decoding includes means for reordering said sequences of bit metrics so as to reverse a bit diffusion operation.

11. A receiver as claimed in claim 9 wherein said bits represented by said symbols include transmitted data encoded in a convolutional code, and wherein said decoding means includes means for deconvoluting inverse to said convolutional code.

12. A receiver as claimed in claim 11 wherein said convolutional code is a punctured convolutional code.

13. A receiver as claimed in claim 11 and wherein said decoding means includes means for forming one or more sequences of said bit metrics and inserting dummy data at predetermined intervals into said one or more sequences of bit metrics.

14. A receiver as claimed in claim 11 wherein said means for deconvoluting includes means for deconvoluting according to a most likelihood decoding scheme.

15. A receiver as claimed in claim 11 wherein said means for deconvoluting includes means for deconvoluting according to a Viterbi decoding scheme.

16. A method of receiving data including a series of multi-component signals representing symbols selected from a set of possible multi-component, multi-value symbols, each component of said signal denoting values of a plurality of bits, each bit being associated with one component of said signal, said method comprising the steps of:

determining the value of each component in each received signal; and setting a value of a bit metric for each bit denoted by said signal based upon the value of the signal component associated with that bit, there being first, second and third ranges defined for each bit, said value-setting step being performed for each bit so that:

(a) the bit metric has a predetermined maximum value when the component associated with the bit is in the first range defined for that bit;

(b) the bit metric has a predetermined minimum value when the component associated with the bit is in the second range defined for that bit; and (c) the bit metric has an intermediate value between said maximum and minimum values when the component defined for the bit is in the third range associated with the bit.

17. A method as claimed in claim 16 wherein said setting step is performed so that the bit metric for each bit denoted by each received signal is correlated with the probability that the received signal represents a transmitted symbol denoting a first value of that bit.

18. A method as claimed in claim 17 wherein said first value is 0.

19. A method as claimed in claim 16 or claim 17 wherein said setting step includes the step of setting set the bit metric for each bit by interpolation between said minimum and maximum values when the associated component of the received symbol is in the third range defined for that bit.

20. A method as claimed in claim 16 or claim 17 wherein said setting step includes the steps of:
(a) selecting an address in a memory for each bit of each received signal based upon the component of such received signal associated with that bit; and (b) reading out of said memory the bit metric stored at each selected address, different bit metrics being stored at different addresses in said memory.

21. A method as claimed in claim 16 or claim 17 wherein a first component in the received signal varies over a first domain less than a first nominal value; a second domain between said first nominal value and a second nominal value; a third domain between said second nominal value and a third nominal value; a fourth domain between said third nominal value and a fourth nominal value; and a fifth domain greater than said fourth nominal value, and wherein said first range for a first bit associated with said first component includes said first and second domains; said second range for said first bit includes said fourth and fifth domains; and said third range for said first bit includes said third domain.

22. A method as claimed in claim 21 wherein said first range for another bit associated with said first component includes said first and fifth domains; said second range for said another bit includes said third domain; and said third range for said another bit includes said second and fourth domains.

23. A method according to claim 16 or claim 17 further comprising the step of serializing the components, said step of setting the bit metrics being performed first for the bits associated with one component of each signal and then for the bits associated with another component the signal.

24. A method as claimed in 16 or claim 17 further comprising the step of processing said bit metrics and recovering transmitted data therefrom.

25. A method as claimed in claim 24 wherein said processing step includes the steps of forming one or more sequences of said bit metrics and reordering said sequences of bit metrics so as to reverse a bit diffusion operation.

26. A method as claimed in claim 24 wherein said bits include transmitted data encoded in a convolutional code, and wherein said processing step includes the step of deconvoluting inverse to said convolutional code.

27. A method as claimed in claim 26 wherein said convolutional code is a punctured convolutional code.

28. A method as claimed in claim 26 and wherein said processing step includes the steps of forming one or more sequences of said bit metrics and inserting dummy data at predetermined intervals into said one or more sequences of bit metrics.

29. A method as claimed in claim 26 wherein said deconvoluting step includes the step of deconvoluting according to a most likelihood decoding scheme.

30. A method as claimed in claim 26 wherein said deconvoluting step includes the step of deconvoluting according to a Viterbi decoding scheme.

* * * * *

UNITED STATES PATENT AND TRADEMARK OFFICE
CERTIFICATE OF CORRECTION

PATENT NO.     : 6,327,316 B1
DATED          : December 4, 2001
INVENTOR(S)    : Tamotsu Ikeda It is certified that error appears in the above-identified patent and that said Letters Patent is hereby corrected as shown below:

Title page,
Item [57], ABSTRACT,
Line 12, "whereas the" should read -- whereas when the --.

Column 1,
Line 13, "bas" should read -- has --.

Column 3,
Line 28, "is assumed" should read -- are assumed --.

Column 7,
Line 24, "Branch" should read -- branch --.

Column 10,
Line 1, "sequences" should read -- sequence --.

Column 11,
Line 2, "value," should read -- value --.

Column 14,
Line 37, "to in 16-QAM" should read -- to 16-QAM --.

Column 27,
Line 27, "signal can one" should read -- signal. One --.
Line 48, "include" should read -- includes --.

Column 28,
Line 23, "claim 11 and wherein" should read -- claim 11 wherein --.
Line 66, "setting set the" should read -- setting the --.

UNITED STATES PATENT AND TRADEMARK OFFICE
CERTIFICATE OF CORRECTION

PATENT NO. : 6,327,316 B1
DATED : December 4, 2001
INVENTOR(S) : Tamotsu Ikeda

It is certified that error appears in the above-identified patent and that said Letters Patent is hereby corrected as shown below:

<u>Column 30,</u>
Line 3, "component the signal" should read -- component of the signal --.
Line 17, "claim 27 and wherein" should read -- claim 27 wherein --.

Signed and Sealed this

Thirtieth Day of July, 2002

*Attest:*

JAMES E. ROGAN
*Attesting Officer*              *Director of the United States Patent and Trademark Office*